United States Patent
Reiner et al.

(10) Patent No.: US 12,159,470 B2
(45) Date of Patent: Dec. 3, 2024

(54) DRIVER PREDICTIVE MENTAL RESPONSE PROFILE AND APPLICATION TO AUTOMATED VEHICLE BRAIN INTERFACE CONTROL

(71) Applicant: NeuCogs Ltd., Haifa (IL)

(72) Inventors: Miriam Reiner, Haifa (IL); Shay Hilel, Tel-Mond (IL); Zeev Hadar, Tel-Mond (IL)

(73) Assignee: NeuCogs Ltd., Haifa (IL)

( * ) Notice: Subject to any disclaimer, the term of this patent is extended or adjusted under 35 U.S.C. 154(b) by 378 days.

(21) Appl. No.: 17/055,584

(22) PCT Filed: May 14, 2019

(86) PCT No.: PCT/IL2019/050546
§ 371 (c)(1),
(2) Date: Nov. 15, 2020

(87) PCT Pub. No.: WO2019/220436
PCT Pub. Date: Nov. 21, 2019

(65) Prior Publication Data
US 2021/0221404 A1 Jul. 22, 2021

Related U.S. Application Data

(60) Provisional application No. 62/670,890, filed on May 14, 2018.

(51) Int. Cl.
*B60W 60/00* (2020.01)
*B60W 40/08* (2012.01)
(Continued)

(52) U.S. Cl.
CPC ........... *G06V 20/597* (2022.01); *B60W 40/08* (2013.01); *B60W 60/0051* (2020.02);
(Continued)

(58) Field of Classification Search
CPC .. G06V 20/597; G06V 40/28; B60W 60/0051
See application file for complete search history.

(56) References Cited

U.S. PATENT DOCUMENTS 5,573,006 A * 11/1996 Shimotani ................. G06T 7/73
600/558
5,689,241 A 11/1997 Clarke, Sr. et al.
(Continued)

FOREIGN PATENT DOCUMENTS

WO WO 2019/220436 11/2019

OTHER PUBLICATIONS

International Preliminary Report on Patentability Dated Nov. 26, 2020 From the International Bureau of WIPO Re. Application No. PCT/IL2019/050546. (10 Pages).
(Continued)

*Primary Examiner* — Jess Whittington

(57) ABSTRACT

A method for updating response profiles of drivers, comprising receiving a plurality of images captured by one or more imaging sensors deployed to monitor one or more eyes of a driver of a vehicle, analyzing at least some of the plurality of images to identify one or more eye dynamics signal patterns preceding one or more abnormal driving events occurring in an environment of the vehicle, updating a response profile of the driver based on an association of one or more of the abnormal driving event and the one or more of the identified eye dynamics signal patterns and providing information based on the updated response profile of the driver. The provided information is configured to enable one or more control systems of the vehicle to predict an imminent abnormal driving event based on an eye dynamics signal of the driver.

20 Claims, 7 Drawing Sheets

(51) Int. Cl.
*G05D 1/00* (2006.01)
*G06V 20/59* (2022.01)
*G06V 40/16* (2022.01)
*G06V 40/18* (2022.01)
*G06V 40/19* (2022.01)
*G06V 40/20* (2022.01)

(52) U.S. Cl.
CPC ......... *G05D 1/0055* (2013.01); *G06V 40/176* (2022.01); *G06V 40/18* (2022.01); *G06V 40/19* (2022.01); *G06V 40/23* (2022.01); *G06V 40/28* (2022.01)

(56) References Cited

U.S. PATENT DOCUMENTS

| | | | |
|---|---|---|---|
| 6,097,295 A * | 8/2000 | Griesinger | A61B 5/18 340/576 |
| 6,859,144 B2 | 2/2005 | Newman et al. | |
| 9,165,280 B2 | 10/2015 | Basson et al. | |
| 9,650,041 B2 | 5/2017 | Feit et al. | |
| 10,874,340 B2 * | 12/2020 | Rau | G16H 40/67 |
| 2007/0073463 A1 * | 3/2007 | Sherony | G08G 1/165 701/45 |
| 2010/0256835 A1 | 10/2010 | Mudalige | |
| 2014/0276090 A1 * | 9/2014 | Breed | A61B 5/1455 600/473 |
| 2016/0026182 A1 * | 1/2016 | Boroditsky | G08G 1/22 701/23 |
| 2017/0072850 A1 | 3/2017 | Curtis et al. | |
| 2017/0258396 A1 * | 9/2017 | Sakai | A61B 5/4035 |
| 2018/0043829 A1 | 2/2018 | Cordell et al. | |
| 2018/0125406 A1 * | 5/2018 | Yamada | A61B 5/165 |
| 2019/0023208 A1 * | 1/2019 | Boston | G06V 20/597 |
| 2019/0047582 A1 * | 2/2019 | Anderson | B60K 35/00 |
| 2019/0279009 A1 * | 9/2019 | Srirangam Narashiman | G06T 7/248 |
| 2019/0343382 A1 * | 11/2019 | Rubner | G06F 3/0481 |
| 2021/0186318 A1 * | 6/2021 | Yellin | G06F 18/214 |

OTHER PUBLICATIONS

International Search Report and the Written Opinion Dated Nov. 4, 2019 From the International Searching Authority Re. Application No. PCT/IL2019/050546. (15 Pages).

Committee on Metabolic Monitoring "Monitoring Metabolic Status: Predicting Decrements in Physiological and Cognitive Performance", Committee on Metabolic Monitoring for Military Field Applications, Standing Committee on Military Nutrition Research, Food and Nutrition Board, Institute of Medicine of the National Academies, National Academy of Sciences, p. 1-450, 2004.

Jonckers et al. "Functional Connectivity fMRI of the Rodent Brain: Comparison of Functional Connectivity Networks in Rat and Mouse", PLoS One, 6(4): e18876-1-e18876-9, Published Online Apr. 18, 2011.

Lim et al. "Imaging Brain Fatigue From Sustained Mental Workload: An ASL Perfusion Study of the Time-on-Task Effect", NeuroImage, 49(4): 3426-3435, Feb. 15, 2010.

Matthews et al. "Stress: Theory", Stress, Workload, and Fatigue, Series: Human Factors in Transportation, 1st Ed., Chap.1: 1-54, Nov. 1, 2000.

Son et al. "Identification of Driver Cognitive Workload Using Support Vector Machines With Driving Performance, Physiology and Eye Movement in a Driving Simulator", International Journal of Precision Engineering and Manufacturing, 14(8): 1321-1327, Aug. 1, 2013.

\* cited by examiner

DRIVER PREDICTIVE MENTAL RESPONSE PROFILE AND APPLICATION TO AUTOMATED VEHICLE BRAIN INTERFACE CONTROL

RELATED APPLICATIONS

This application is a National Phase of PCT Patent Application No. PCT/IL2019/050546 having International filing date of May 14, 2019, which claims the benefit of priority under 35 USC § 119(e) of U.S. Provisional Patent Application No. 62/670,890 filed on May 14, 2018 The contents of the above applications are all incorporated by reference as if fully set forth herein in their entirety.

BACKGROUND

The present invention, in some embodiments thereof, relates to controlling automatically an at least partially autonomous vehicle, and, more specifically, but not exclusively, to controlling automatically an at least partially autonomous vehicle according to abnormal driving events predicted by analyzing driver's response dynamics based on a response profile of the driver mapping response dynamics patterns identified to precede the abnormal driving events.

The arena of autonomous vehicles, either ground vehicles, aerial vehicles and/or naval vehicles has witnessed an enormous evolution during the recent few years. Major resources are invested in the autonomous vehicles technologies and the field is therefore quickly moving forward towards the goal of deploying autonomous vehicles for a plurality of applications, for example, transportation, industrial, military uses and/or the like.

The autonomous vehicles involve a plurality of disciplines targeting a plurality of challenges rising in the development of the automated system controlling the autonomous vehicles. One of the most challenging disciplines entailing major effects which may significantly impact the way these automated systems are designed and deployed relates to the functionality, state and well-being of the passengers/driver and interaction between the automated systems and the driver and/or the passengers.

The autonomous vehicles' systems, even if fully autonomous, and definitely during the transition stage towards full self-driving vehicles, may require human attention and awareness. In addition, as the autonomous cars reduce the load on the human driver (passenger), the excessively low workload imposed on the driver may lead to driver's passive fatigue, caused by low cognitive load or boredom which in turn may reduce response time and quality of performance. On the other extreme, of performance of demanding tasks leading to high cognitive workload is also correlated with slow reaction time, deterioration in human task-performance in terms of time-on-task and error rate.

A fundamental challenge relating to human-machine design is the need to design the autonomous systems such that the drivers are aware and fully understand the capabilities, boundaries and limitations of the autonomous car systems. The driver keeping attention on the vehicle's performance, behavior and immediate responses may be required to make fast and accurate decisions on when the control must be transferred from the human to the at least partially autonomous, and vice versa, form the vehicle to the driver.

The extent of human intervention in the autonomous vehicle automated systems must be therefore evaluated and decided. This challenge further intensifies due to the differences between drivers, for example, speed of processing environmental cues, patterns of attention and/or inattention, patterns of responses in non-attentive or partially attentive states, distraction patterns, fatigue and boredom responses, resilience to a high stress events, accumulation of stress along multiple frequent events of different types, ability to convey/receive information form the vehicle and/or the like.

SUMMARY

According to a first aspect of the present invention there is provided a method for updating response profiles of drivers, the method comprising:
Receiving a plurality of images captured by one or more imaging sensors deployed to monitor one or more eyes of a driver of a vehicle.
Analyzing at least some of the plurality of images to identify one or more eye dynamics signal patterns preceding one or more abnormal driving events occurring in an environment of the vehicle.
Updating a response profile of the driver based on an association of one or more of the abnormal driving event and the one or more of the identified eye dynamics signal patterns.
Providing information based on the updated response profile of the driver. The provided information is configured to enable one or more control systems of the vehicle to predict an imminent abnormal driving event based on an eye dynamics signal of the driver.

According to a second aspect of the present invention there is provided a non-transitory computer readable medium storing a software program comprising data and computer implementable instructions for carrying out a method for updating response profiles of drivers of vehicles, the method comprising:
Receiving a plurality of images captured by one or more imaging sensors deployed to monitor one or more eyes of a driver of a vehicle.
Analyzing at least some of the plurality of images to identify one or more eye dynamics signal patterns preceding one or more abnormal driving events occurring in an environment of the vehicle.
Updating a response profile of the driver based on an association of one or more of the abnormal driving event and the one or more of the identified eye dynamics signal patterns.
Providing information based on the updated response profile of the driver. The provided information is configured to enable one or more control systems of the vehicle to predict an imminent abnormal driving event based on an eye dynamics signal of the driver.

According to a third aspect of the present invention there is provided a system for updating response profiles of drivers, the system comprising one or more processors configured to:
Receive a plurality of images captured by one or more imaging sensors deployed to monitor one or more eyes of a driver of a vehicle.
Analyze at least some of the plurality of images to identify one or more eye dynamics signal patterns preceding one or more abnormal driving events occurring in an environment of the vehicle.
Update a response profile of the driver based on an association of one or more of the abnormal driving event and the one or more of the identified eye dynamics signal patterns.

Provide information based on the updated response profile of the driver. The provided information is configured to enable one or more control systems of the vehicle to predict an imminent abnormal driving event based on an eye dynamics signal of the driver.

According to a fourth aspect of the present invention there is provided a method for automatically controlling vehicles according to response profiles of drivers, the method comprising:

Receiving a plurality of images captured by one or more imaging sensors deployed to monitor one or more eyes of a driver of a vehicle.

Analyzing at least some of the plurality of images to identify one or more eye dynamics signal patterns.

Using one or more of the identified eye dynamics signal patterns to predict one or more imminent abnormal driving events based on a response profile of the driver.

Initiating one or more actions for controlling the vehicle according to one or more of the predicted abnormal driving events.

According to a fifth aspect of the present invention there is provided a non-transitory computer readable medium storing a software program comprising data and computer implementable instructions for carrying out a method for automatically controlling vehicles according to response profiles of drivers, the method comprising:

Receiving a plurality of images captured by one or more imaging sensors deployed to monitor one or more eyes of a driver of a vehicle.

Analyzing at least some of the plurality of images to identify one or more eye dynamics signal patterns.

Using one or more of the identified eye dynamics signal patterns to predict one or more imminent abnormal driving events based on a response profile of the driver.

Initiating one or more actions for controlling the vehicle according to one or more of the predicted abnormal driving events.

According to a sixth aspect of the present invention there is provided a system for automatically controlling vehicles according to response profiles of drivers, the system comprising one or more processors of one or more control systems of a vehicle. The one or more processors are configured to:

Receive a plurality of images captured by one or more imaging sensors deployed to monitor one or more eyes of a driver of a vehicle.

Analyze at least some of the plurality of images to identify one or more eye dynamics signal patterns.

Use one or more of the identified eye dynamics signal patterns to predict one or more imminent abnormal driving events based on a response profile of the driver.

Initiate one or more actions for controlling the vehicle according to one or more of the predicted abnormal driving events.

In an optional implementation form of the first, second and/or third aspects, one or more additional one or more additional eye dynamics signal patterns are identified succeeding one or more of the abnormal driving events to validate one or more of the eye dynamics signal patterns identified prior to the respective abnormal driving events, by:

Analyzing at least some of the plurality of images to identify one or more additional eye dynamics signal patterns succeeding the one or more abnormal driving event.

In response to one or more of the identified additional eye dynamics signal patterns occurring within a selected time window after the one or more abnormal driving event, forgoing updating the response profile of the driver using one or more of the identified eye dynamics signal patterns.

In an optional implementation form of the first, second and/or third aspects, one or more of the identified eye dynamics signal patterns identified prior to one or more of the abnormal driving events are correlated with time windows succeeding the respective abnormal driving events, by:

In response to the identified one or more eye dynamics signal pattern occurring within a first selected time window prior to the one or more abnormal driving event, making a first update to the response profile of the driver.

In response to the identified one or more eye dynamics signal pattern occurring within a second selected time window prior to the one or more abnormal driving event, making a second update to the response profile of the driver. Wherein the second update differs from the first update and the second selected time window differs from the first selected time window.

In an optional implementation form of the first, second and/or third aspects, in response to one or more of the identified eye dynamics signal patterns occurring within a selected time window prior to one or more of the abnormal driving events, forgoing updating the response profile of the driver using one or more of the identified eye dynamics signal patterns.

In a further implementation form of the first, second and/or third aspects, the plurality of images is captured during drive simulations presented to the driver.

In a further implementation form of the first, second and/or third aspects, the plurality of images is captured during real world drives of the driver in a vehicle.

In an optional implementation form of the first, second and/or third aspects, the response profile of the driver is updated to associate one or more of the abnormal driving events with one or more other dynamics patterns of the driver identified to precede the respective one or more abnormal driving events. The one or more other dynamics patterns are identified based on a facial expression of the driver, a limb gesture of the driver, a bodily gesture of the driver, a body pose of the driver and/or a combination thereof.

In an optional implementation form of the first, second and/or third aspects, the response profile of the driver is updated based on one or more driver state parameter derived from an analysis of fluctuations of a pupil of the one or more eye detected in at least some of the plurality of images. One or more of the driver state parameters are indicative of a physiological state of the driver, a cognitive state of the driver and/or an emotional state of the driver.

In a further implementation form of the first, second and/or third aspects, each of the one or more eye dynamics signal patterns describes one or more properties of the eye dynamics of the driver such as, for example, a dilatation level of a pupil of the one or more eye, a contraction level of the pupil of the one or more eye, a pupillary response time of a pupil of the one or more eye, a frequency of movement of the one or more eye, a gaze vector of the one or more eye, a saccade and/or the like.

In a further implementation form of the first, second, third, fourth, fifth and/or sixth aspects, each of the one or more imaging sensors comprises an infrared imaging sensor and/or a thermal imaging sensor.

In a further implementation form of the first, second, third, fourth, fifth and/or sixth aspects, each abnormal driving event includes a surprising event, an unusual event, a potential collision event, a potential life threatening event, a potential injury damage event and/or the like.

In a further implementation form of the first, second, third, fourth, fifth and/or sixth aspects, the response profile of the driver is updated according to one or more other response profiles created for one or more other drivers sharing one or more common attributes with the driver.

In an optional implementation form of the fourth, fifth and/or sixth aspects, one or more additional eye dynamics signal patterns are identified, by:

Receiving a second plurality of images captured by the one or more imaging sensor after the identification of the one or more eye dynamics signal pattern.

Analyzing at least some of the second plurality of images to identify one or more additional eye dynamics signal pattern.

Calculating an elapsed time between an occurrence of the one or more eye dynamics signal pattern and an occurrence of the one or more additional eye dynamics signal pattern.

In response to a first calculated elapsed time, initiating one or more additional action for controlling the vehicle.

In response to a second calculated elapsed time, forgoing initiating the one or more additional action for controlling the vehicle, where the second calculated elapsed time is shorter than the first calculated elapsed time.

In an optional implementation form of the fourth, fifth and/or sixth aspects, one or more of the actions are adjusted according to one or more of: a physiological state of the driver, a cognitive state of the driver and/or an emotional state of the driver.

In an optional implementation form of the fourth, fifth and/or sixth aspects, one or more abnormal driving events are determined according to one or more other dynamics patterns predicted to precede one or more of the abnormal driving events in the response profile of the driver. The one or more other dynamics patterns are identified based on a facial expression of the driver, a limb gesture of the driver, a bodily gesture of the driver, a body pose of the driver and/or a combination thereof.

In an optional implementation form of the fourth, fifth and/or sixth aspects, one or more second actions are initiated for controlling the vehicle according to a response of the driver to one or more of the actions. The response of the driver is determined according to an analysis of one or more images captured by one or more of the imaging sensors after one or more of the (first) actions are initiated.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit that might include sensors for acquisition of data. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
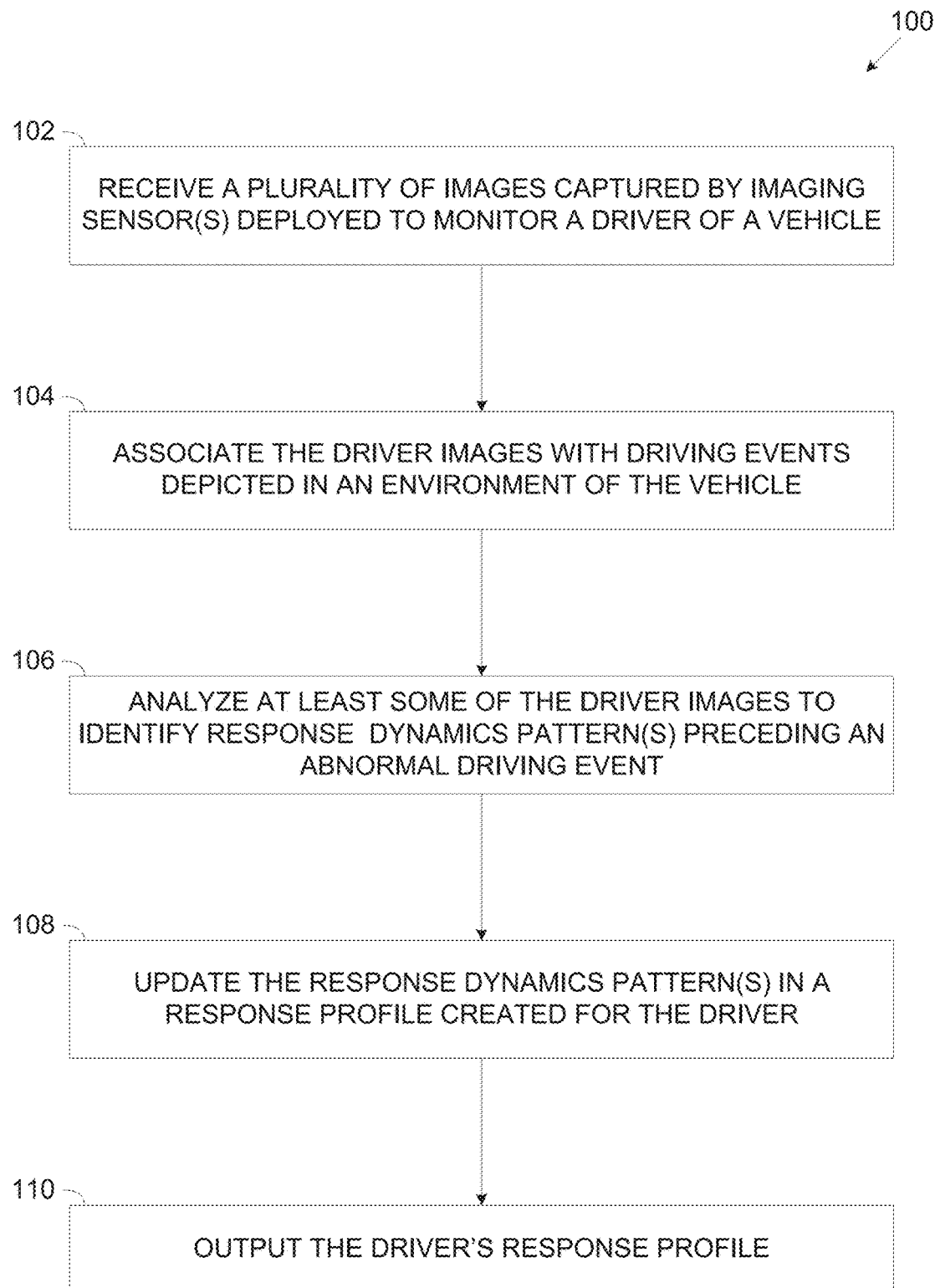
FIG. 1 is a flowchart of an exemplary process of creating and/or updating a response profile for a driver mapping the driver's response dynamics preceding abnormal driving events, according to some embodiments of the present invention.

The present invention, in some embodiments thereof, relates to controlling automatically an at least partially autonomous vehicle, and, more specifically, but not exclusively, to controlling automatically an at least partially autonomous vehicle according to abnormal driving events predicted by analyzing driver's response dynamics based on a response profile of the driver mapping response dynamics patterns identified to precede the abnormal driving events.

According to some embodiments of the present invention, there are provided methods, systems and computer program products for creating and/or updating a response profile for a driver which maps some of the patterns of bodily response dynamics, for example, eye and/or pupil dynamics, facial expressions, limb (hands) gestures, body gestures, body poses and/or the like identified to precede abnormal driving events.

The abnormal driving events include unusual, surprising, stressing, life and/or injury threatening driving events encountered by the driver while driving a vehicle, for example, a collision with another object (vehicle, pedestrian, bicycle rider, road infrastructure, etc.), drifting off the road and/or the like.

The response dynamics patterns may be identified by monitoring and analyzing the bodily dynamics of the driver in response to one or more abnormal driving events encountered by the driver during one or more training driving sessions conducted either in a real world environment and/or in a simulated environment. The identified response dynamics patterns correlated with the respective abnormal driving events may be recorded and logged in the response profile created for the driver.

One or more control systems which automatically control one or more driving operations of an at least partially autonomous vehicle driven by the driver may use the response profile to predict one or more upcoming abnormal driving events. During a drive of the driver in the vehicle, the control system(s) may monitor the bodily dynamics of the driver in real-time and may compare it with the response dynamics patterns mapped in the response profile of the driver. A match between the real-time bodily dynamics and one or more of the response dynamics patterns may be highly predictive of an upcoming abnormal driving event.

Based on the estimated upcoming abnormal driving events and take one or more vehicle control actions accordingly, for example, maneuvering, steering, breaking, accelerating, decelerating and/or the like in attempt to prevent the predicted abnormal driving event and/or reduce or limit the impact and effects of such this abnormal driving event.

Predicting the upcoming abnormal driving events may be based on the human brain perception abilities to identify and interpret signs, cues, indications and/or conditions preceding unusual events, specifically life and/or injury threatening events. In response to signs, cues, indications and/or conditions the brain activity expressed via the activity of the human sympathetic neural system may significantly increase in order to take measures to encounter the potential threatening events. For example, the neural system may activate physiological systems which enhance brain and/or body activities critical for dealing with the unusual event while reducing the activity of other non-essential brain and/or body activities.

As described in detail herein after, the enhanced activity of the sympathetic neural system may be projected via changes in one or more properties of the eye and/or pupil dynamics, for example, a movement frequency, a gaze vector, a saccade (and micro-saccade), a fixation time, a pupillary response time, an object recognition time, an object tracking response time, a drift time and/or the like. Thus, the eye and/or pupil dynamics may be highly indicative of the increased neural system activity, in particular in response to the life and/or injury threatening events.

Exploiting this revelation, the eye dynamics (and optionally other bodily response dynamics) may be monitored and analyzed in particular with correlation to the abnormal driving events in order to establish a Brain-Machine Interface (BMI) which may be applied for identifying eye dynamics response patterns and associating them with the respective abnormal driving events. This BMI which may be further employed in real-time to predict the abnormal driving events may be inherently faster and more immediate compared to Human-Machine Interfaces (HMI) which are based on bodily activations initiated by the driver.

As experimented and demonstrated herein after, the brain activities increase in response to the perceived signs, cues, signals indications and/or conditions preceding an abnormal driving event may precede the actual occurrence of the preceding abnormal driving event by over 3 seconds.

Therefore, by analyzing the eye dynamics of the driver in real-time during a drive of the driver in the at least partially autonomous vehicle and predicting an abnormal driving event based on a match between the real-time and eye dynamics response patterns mapped in the response profile, the control system(s) may be able to predict one or more upcoming abnormal driving events. The control system(s) may then initiate one or more vehicle control actions well prior to the occurrence of the predicted abnormal driving event. This may significantly extend the response time period available for the control system(s) to initiate actions for preventing the predicted abnormal driving event or at least reducing or limiting its impact and/or effects.

Optionally, one or more response profiles may be created and/or updated for a plurality of drivers by aggregating the bodily dynamics patterns identified for at least some of these plurality of drivers thus creating and/or updating a representative response profile which may be applied to other drivers. In particular, the representative response profiles may be created and/or updated for one or more segments of drivers sharing one or more common attributes and/or characteristics, for example, gender, age, driving experience, mental state, health and illness characteristics and/or the like.

Moreover, one or more Machine Learning (ML) models may be applied to associate the bodily response dynamics of a plurality of drivers with respective abnormal driving events in order to create and/or update enhanced response profiles which may further enhance over time as additional bodily response dynamics may be collected analyzed and mapped.

Optionally, bodily response dynamics identified in response to one or more vehicle control actions initiated by the control system(s) may also be analyzed and mapped accordingly such that the control system(s) may initiate further vehicle action(s) based on the identified response of the driver to the first vehicle control action(s).

Optionally, one or more of the response dynamics patterns may be adjusted according to a driver state of the driver, for example, a mental state (e.g. alertness, engagement, stress, perception, etc.), a mental load, a physiological state (e.g. fatigue, sensory deficiencies, etc.), emotional state and/or the like. The driver state may significantly affect the response capabilities of the drivers which may be this reflected in the response dynamics patterns.

Mapping the response dynamics patterns of the drivers to predict respective abnormal driving events may present major benefits and advantages compared to existing methods for establishing a BMI in particular in the context of autonomous vehicle control.

First, applying the bodily dynamics BMI for predicting the abnormal driving events based on the increased brain activity in response to the signs, cues, indications and/or conditions preceding the abnormal driving events may significantly increase the response time available for the control system(s) to initiate vehicle control actions prior to the actual occurrence of the predicted abnormal driving event which may thus significantly increase the probability for successfully preventing the predicted abnormal driving event and/or limiting its impact and/or effects. Moreover, the bodily dynamics BMI may be significantly faster and instantaneous compared to HMI implementations which may be employed in existing vehicle control systems.

Some of the existing methods for detecting increased brain activity may rely on bodily measures which may be significantly difficult to monitor, measure and/or analyze, in particular in the limited environment of a vehicle. For example, some of the existing methods may identify the brain activity based on analysis of electroencephalographic activity or other electrophysiological measures of the brain function. Such methods may be based on recording Electro-Encephalographic (EEG) activity and/or single-neuron activity recorded within the cortex using attachable and/or wearable sensors such as, for example, electrodes attached to the scalp of the person. Such implementations may be naturally impractical in the context of a driver in a vehicle. In another example, some of the existing methods for monitoring and interpreting bodily response to stressful events may rely on Heart Rate Variability (HRV), Galvanic Skin Response (GSR) and/or the like. These methods which may be significantly less effective for determining brain activity also require attaching sensors to the person body.

Other existing methods may use functional Magnetic Resonance Imaging (fMRI) for monitoring and analyzing blood flow in the brain indicative of brain, neural and/or motoric activity in particular, activation of the right lateralized fronto-parietal attentional network in addition to the basal ganglia and sensorimotor cortices. Deploying fMRI equipment in the limited space of the vehicle may be impractical, not to mention the extremely high cost of such systems.

The bodily response dynamics, specifically the eye dynamics response dynamics the other hand may be highly indicative of the brain activity, in particular in response to the abnormal driving events thus allowing for high accuracy prediction of abnormal driving events. Moreover, monitoring and analyzing the bodily response dynamics may require simple and very low cost hardware resources (essentially one or more imaging devices) which may be easily deployed in the vehicle to monitor the driver.

Moreover, creating and/or updating and/or adjusting the response profiles according to bodily response dynamics identified for a plurality of drivers and optionally passengers may significantly improve the accuracy of the identified response dynamics patterns. These response profiles aggregating the data collected for a plurality of drivers may be further applied for other drivers, in particular drivers sharing common attributes and properties with the drivers whose bodily response dynamics was used to create and/or update the response profile. The accuracy and/or applicability of the aggregated and/or personal response profiles may be further increase using the ML models which may continuously evolve and adapt to new drivers, new abnormal driving events, new control systems and/or the like.

Furthermore, adjusting the response profile and the response dynamics patterns according to the driver state may significantly increase the prediction accuracy of the abnormal driving events based on their correlation with the adjusted response dynamics patterns since the driver state may have significant effect on the response capabilities of the drivers.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of creating and/or updating a response profile for a driver mapping the driver's response dynamics preceding abnormal driving events, according to some embodiments of the present invention. An exemplary process 100 may be executed to create and/or update a driver's response profile for one or more drivers of an at least partially autonomous vehicle. While the process 100 may be conducted for practically any vehicle, for example, a ground vehicle, an aerial vehicle, a naval vehicle and/or the like, the process 100 may typically be applied to create and/or update a driver's response profile for drivers of ground vehicles such as, for example, a car, a truck, a bus and/or the like.

The response profile may include one or more response patterns expressing patterns of bio markers identified, by monitoring the driver, to precede driving events encountered by the driver during one or more training sessions. In particular, the response profile includes response pattern(s) identified to precede abnormal driving events which may be unusual, surprising, stressing, life threatening and/or the like.

The bio markers are typically triggered automatically by the driver's brain (with no conscious brain action) in response to cues, indications, signs, conditions and/or the like preceding one or more abnormal driving events. The response patterns therefore express automatically and/or unconsciously triggered bio markers preceding the abnormal driving event(s) rather than consciously initiated actions taken by the driver.

As known in the art, the bio markers may express with high accuracy the driver's state of mind, for example, a stress level, an attention level, an engagement level, a perception level, a surprise and/or the like. As such the response patterns comprising patterns of the bio markers identified to precede one or more of the abnormal driving events during the training sessions may be highly predictive of these abnormal driving events.

One or more of the response pattern(s) may relate to eye dynamics expressed bio markers, specifically, pupillary dynamics expressed bio markers. Such response patterns may reflect a pattern of one or more properties of the eye and/or pupillary dynamics, for example, a movement frequency, a gaze vector, a saccade (and micro-saccade), a fixation time, a pupillary dilatation level, a pupillary contraction level, a pupillary response time, an object recognition time, an object tracking response time, a drift time and/or the like. Optionally, one or more of the response pattern(s) may relate to one or more properties of one or more other bio markers, for example, a facial expression, a limb gesture, a bodily gesture and a body pose.

The response profile created and/or updated for one or more of the drivers may then be provided for real-time use by one or more control systems of the at least partially autonomous vehicle. The control system(s) which may track and analyze the bio markers of the driver in real-time while driving the vehicle may initiate one or more control actions according to predicted abnormal driving events identified by analyzing the real-time bio markers in relation with the with response patterns documented by the response profile.

Figure 2A:
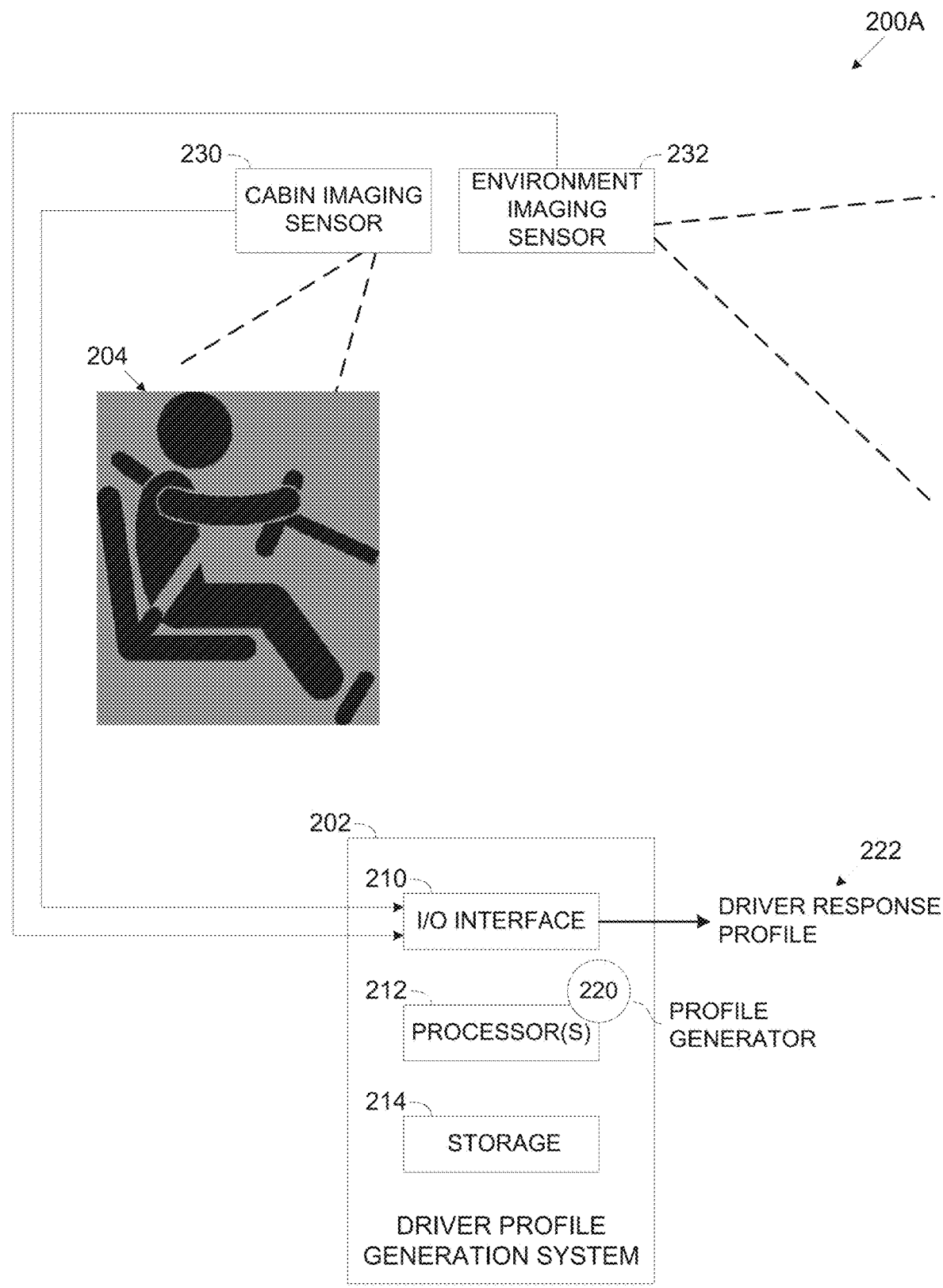
FIG. 2A and FIG. 2B are schematic illustrations of exemplary embodiments of a system for creating and/or updating a response profile for a driver mapping the driver's response dynamics preceding abnormal driving events, according to some embodiments of the present invention.
Figure 2B:
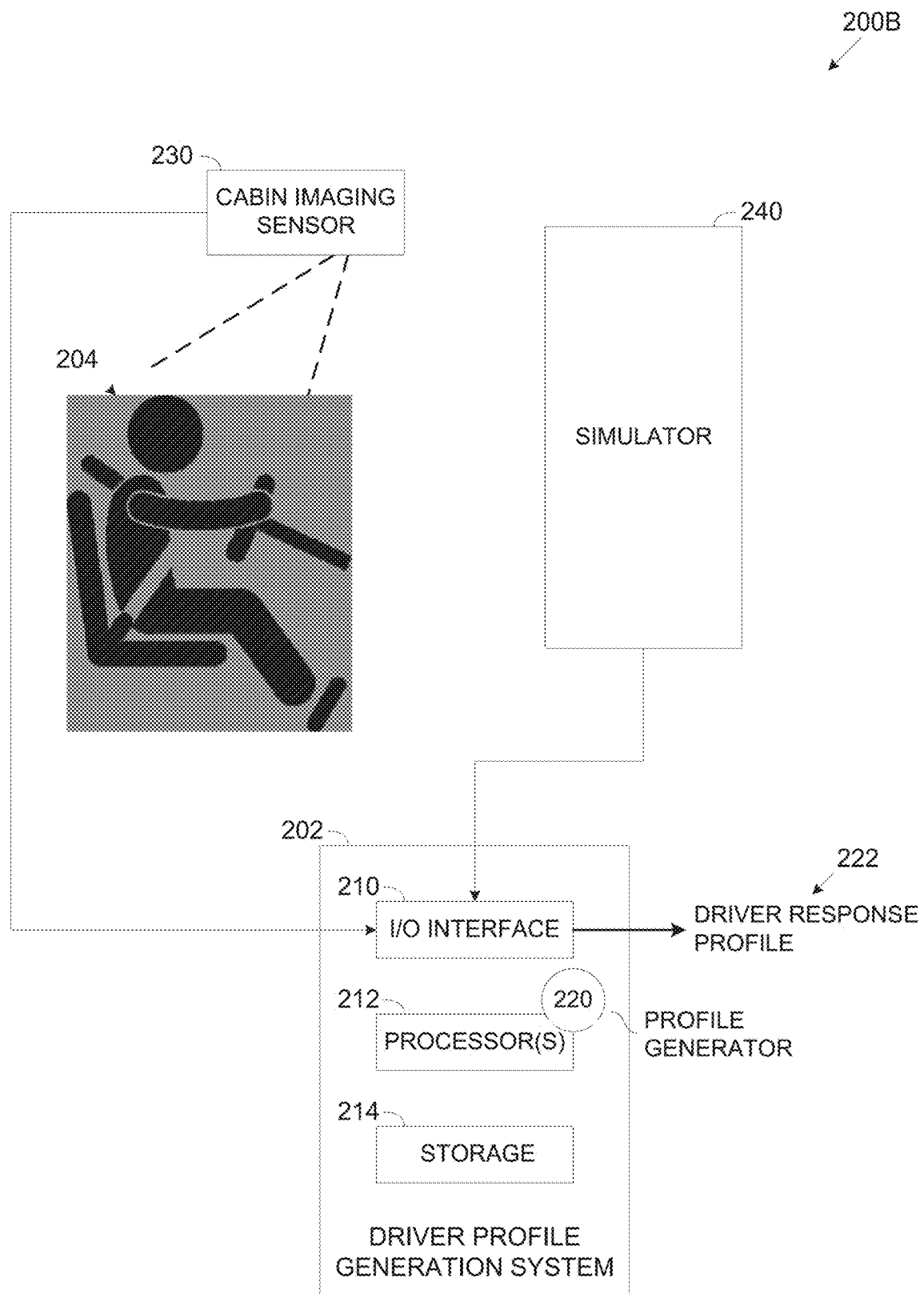

Reference is also made to FIG. 2A and FIG. 2B, which are schematic illustrations of exemplary embodiments of a system for creating and/or updating a response profile for a driver mapping the driver's response dynamics preceding abnormal driving events, according to some embodiments of the present invention. Creating and/or updating the driver's response profile as described in the process 100 may be conducted according to one or more training sessions in which one or more response patterns reflecting the bio markers patterns of the driver may be correlated with driving events, in particular the abnormal driving events. Such training sessions may be conducted in a real drive in which the driver drives a real vehicle in a real environment as described in 200A and/or in a simulated drive in which the driver may be presented with a simulated environment as described in 200B.

An exemplary driver profile generation system 202 may include an Input/Output (I/O) interface 210, a processor(s) 212 for executing the process 100 and storage 214 for storing code (program store) and/or data.

The I/O interface 210 may include one or more wired and/or wireless interconnection interfaces, for example, a Universal Serial Bus (USB) interface, a serial port, a Controller Area Network (CAN) bus interface and/or the like. The I/O interface 210 may further include one or more wired and/or wireless network interfaces, for example, a Local Area Network (LAN) interface, a Wireless LAN (WLAN, e.g. Wi-Fi) interface, a cellular interface and/or the like.

Via the I/O interface 210, the driver profile generation system 202 may communicate with one or more imaging sensors 230 deployed in a cabin of a vehicle to monitor a driver 204. In particular, the imaging sensor(s) 230 may be deployed to monitor the face and optionally the upper body of the driver 204. As such, images captured by the imaging sensor(s) 230 may depict (portray) one or more eyes of the driver 204, face of the driver 204, one or more limbs (specifically hands) of the driver 204 and/or the upper body section of the driver 204 (e.g. waist and/or shoulders up).

The imaging sensor(s) 230 may include one or more sensors of one or more types and/or one technologies, for example, a camera, a video camera, an infrared sensor, a thermal imaging sensor, an ultra-sonic sensor and/or the like which may produce an image and/or a map (e.g. heat map, reflection map, etc.) of the captured body parts of the driver 204.

In case the training session is conducted in a real world environment while the driver 204 is driving in a real vehicle as seen in 200A, the driver profile generation system 202 may communicate, via the I/O interface 210, with one or more imaging sensors 232 such as the imaging sensor 230 deployed in the vehicle to monitor and capture an outside environment of the vehicle.

In case the training session is conducted in a simulated environment as seen in 200B, the driver profile generation system 202 may communicate, via the I/O interface 210, with one or more simulators 240 configured to present a simulated driving environment to the driver 204 sitting in a vehicle simulator. The simulator 240 may consist, for example, of a simulation system generating a simulated seen of the environment which may be projected to the driver 204 via one or more presentation devices, for example, a display, a virtual reality goggles, a Helmet Mounted display (HMD) and/or the like. The simulated seen may include a real world imagery (and optionally sound) of a driving environment as seen from a vehicle driving in one or more real world geographical area. The real world imagery may be further adjusted, edited and/or customized to simulate one or more driving scenarios and/or driving events. Additionally and/or alternatively, the simulated seen may include a Virtual Reality (VR) simulation of one or more driving environments configured to simulate one or more driving scenarios and/or driving events. The simulated seen may further include an Augmented Reality (AR) simulation of one or more real world driving environments augmented to simulate one or more driving scenarios and/or driving events The processor(s) 212, homogenous or heterogeneous, may include one or more processing nodes arranged for parallel processing, as clusters and/or as one or more multi core processor(s). The storage 214 may include one or more non-transitory persistent storage devices, for example, a hard drive, a Flash array and/or the like. The storage 214 may also include one or more volatile devices, for example, a Random Access Memory (RAM) component and/or the like. The storage 214 may further include one or more network storage resources, for example, a storage server, a Network Attached Storage (NAS), a network drive, and/or the like accessible via one or more networks through the I/O interface 210.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212. For example, the processor(s) 212 may execute a profile generator software module 220 for executing the process 100 to create and/or update a response profile 222 for one or more drivers such as the driver 204. The profile generator 220 may optionally utilize one or more hardware elements for executing the process 100 and/or part thereof. Such hardware elements may include, for example, a circuit, a component, an Integrated Circuit (IC), an Application Specific Integrated Circuit (ASIC), a Field Programmable Gate Array (FPGA), a Digital Signals Processor (DSP), a Graphic Processing Units (GPU) and/or the like.

The process 100 and the systems presented in 200A and 200B are described herein for creating and/or update a response profile for a single driver 204. However, this should not be construed as limiting since the process 100 and the systems 200A and 200B may be expanded for creating and/or updating response profiles for a plurality of drivers such as the driver 204.

As shown at 102, the process 100 starts with the profile generator 220 receiving a plurality of images captured by the imaging sensor(s) 230 deployed in the cabin of a vehicle (a real vehicle or a simulator vehicle) to monitor the driver 204, in particular the face and upper body portion of the driver 204. As such the driver images may depict the face of the driver 204, one or more eyes of the driver 204, the head of the driver 204, one or more limbs, in particular hands of the driver 204 and/or the upper body segment of the driver 204 (e.g. waist up, shoulders up, etc.).

Each of the images depicting the driver 204 may be assigned with a timestamp (time tag) indicating the time of capturing the respective image. The timestamp may be assigned to each image by the imaging sensor(s) 230 and/or by the profile generator 220 upon reception of the image.

As shown at 104, at least some of the images depicting the driver 204 may be associated and correlated with one or more driving events encountered by the driver 204 while driving in the real world environment (as seen in 200A) and/or in the simulated environment (as seen in 200B).

The driving events may include one or more driving patterns, for example, driving on a road, driving in a street, accelerating, decelerating, breaking, taking a turn and/or the like. The driving events may further relate to one or more other objects identified in the vehicles environment (real or simulated), for example, another vehicle, a pedestrian, a bicycle rider, road infrastructure (e.g. polls, traffic lights, traffic signs, traffic barriers, etc.), road markings (e.g. road crossing, lane separation markings, etc.) and/or the like. As such, the driving events may include driving events involving interaction between the vehicle driven by the driver 204 and one or more of the other objects and/or driving events involving interaction between one and more of the other objects.

In particular, the driving events encountered during the training session which are of interest may include abnormal driving events which may be unusual, surprising, stressing, life and/or injury threatening and/or the like. In one example, a certain abnormal driving event may include a car accident (car crash) between two or more vehicles and/or vehicle(s) and one or more other objects (e.g. pedestrian, bicycle rider, road infrastructure, etc.) identified in the environment of the vehicle driven by the driver 204. In another example, a certain abnormal driving event may include one or more other vehicles fast approaching the vehicle driven by the driver 204. In another example, a certain abnormal driving event may include a traffic poll falling in front of the vehicle driven by the driver 204. In another example, a certain abnormal driving event may include a pedestrian abruptly stepping into a path of the vehicle driven by the driver 204. In another example, a certain abnormal driving event may include a bicycle rider detected in close proximity to the vehicle driven by the driver 204.

The profile generator 220 may identify one or more of the abnormal driving events in the environment of the vehicle 204 by analyzing the imagery (and optionally the sound) of the environment scene as viewed by the driver 204 during the training session(s).

For example, for training sessions conducted in the real world environment with the imaging sensor(s) 232 deployed to monitor the environment outside the vehicle driven by the driver 204, the profile generator 220 may analyze one or more of the captured images (and optionally the sound) to identify one or more driving events which may be classified as abnormal driving events. In another example, for training sessions conducted in the simulated environment, the profile generator 220, communicating with the simulator 240, may analyze one or more of the images (and optionally the sound) presented to the driver 204 to identify one or more driving events which may be classified as abnormal driving events.

The abnormal driving events may be classified as such either manually and/or automatically. For example, for training sessions conducted in the real world environment, the process 100 may be conducted off-line after the training drive has ended. The images captured by the imaging sensor(s) 232 may be reviewed by one or more persons to classify one or more driving events depicted in the images as abnormal driving events.

Optionally, the profile generator 220 applies one or more trained Machine Learning (ML) models (e.g. a neural network, an SVM, etc.) to the images captured by the imaging sensor(s) 232 during the training session to identify one or more abnormal driving events depicted in the images. The trained ML model(s) may be trained to identify one or more of the abnormal driving events using one or more training and learning methodologies, for example, supervised learning, semisupervised learning, unsupervised learning, reinforced learning and/or a combination thereof. The profile generator 220 may apply the trained ML model(s) either online during the training drive and/or offline after the training drive has ended.

The profile generator 220 may apply the same abnormal driving event classification methodology for training sessions conducted in the simulated environment by analyzing the images presented to the driver 204. However, since the simulated environment may be constructed, adjusted and/or fabricated in advance, the abnormal driving events may be identified and classified as such in advance in the stream of simulation images presented to the driver 204 during the training session(s).

The profile generator 220 may correlate the captured images depicting the driver 204 with the abnormal driving events according to the timestamp assigned to the captured images depicting the driver 204.

For example, for training sessions conducted in the real world environment with the imaging sensor(s) 232 deployed to monitor the environment outside the vehicle driven by the driver 204, each of the images captured by the imaging sensor(s) 232 may be also assigned with a timestamp indicating its time of capture. As described herein before, the timestamp may be assigned to each image by the imaging sensor(s) 232 and/or by the profile generator 220 upon reception of the image. Similarly, for training sessions conducted in the simulated environment in which the profile generator 220 receives the images presented to the driver 204 by the simulator 240, each of the received images may have a timestamp assigned by the simulator 240 and/or by the profile generator 220 upon reception of the image.

Additionally and/or alternatively, for training sessions conducted in the simulated environment, the profile generator 220 may receive from the simulator 240 a timing of one or more of the abnormal driving events presented to the driver 204 during the simulation. This timing may include, for example, a start time of one or more abnormal driving events, a duration time of one or more abnormal driving events, an end time of one or more abnormal driving events and/or the like. Moreover, one or more of the simulated abnormal driving events may be segmented to multiple event segments which may be each assigned with respective timing. For example, a certain car accident abnormal driving event may include a pre-accident segment, and accident segment and a post-accident segment which may be assigned with respective timing (e.g. start, duration and/or end).

As shown at 106, the profile generator 220 may analyze at least some of the images depicting the driver 204 captured by the imaging sensor(s) 230 during one or more of the training session to identify one or more response patterns of bodily dynamics (bio markers) of the driver 204 in particular response patterns preceding one or more of the abnormal driving events encounter by the driver 204.

The response pattern(s) may primarily relate to patterns of eye dynamics bio markers, specifically, pupillary bio markers reflecting one or more patterns of one or more properties of the eye and/or pupillary dynamics, for example, a movement frequency, a gaze vector, a saccade (and micro-saccade), a fixation time, a pupillary response time, an object recognition time, an object tracking response time, a drift time and/or the like. Optionally, one or more of the response pattern(s) may relate to one or more properties of one or more other response dynamics expressed by other bio markers, for example, a facial expression, a limb gesture, a bodily gesture and a body pose. While the description herein after is focused on eye and pupil dynamics bio markers as an exemplary embodiment it should not be construed as limiting since similar methods and techniques may be applied to one or more of the other response dynamics such as the facial expressions, the limb gestures, the bodily gestures and/or the body poses.

Before further describing the process 100 for correlating between eye and/or pupil dynamics and upcoming abnormal driving events which may be unusual, surprising, life and/or injury threatening and/or the like, a physiological theoretical and practical background for this correlation is first presented.

As known in the art, humans as most other creatures have an inherent survival behavior. As part of this survival behavior, in response to signs, cues, indications and/or conditions preceding unusual events, specifically life and/or injury threatening events, the human brain activates the sympathetic nervous system which enhances some brain and body activities critical to deal with the unusual event while reducing the activity of other non-essential brain and/or body activities.

While the enhanced brain activity may be expressed via electroencephalographic activity or other electrophysiological measures, such brain activity may also be expressed by one or more of the bio markers, in particular the eye and/or pupillary bio markers. Thus, the brain activity and processes may be expressed via changes in the properties of the eye and/or pupillary dynamics such as, for example, a movement frequency, a gaze vector, a saccade (and micro-saccade), a fixation time, a pupillary response time, an object recognition time, an object tracking response time, a drift time and/or the like.

The pupil of the eye is controlled by the two muscles, the dilator and the constrictor. The stimulation of the dilator and/or inhibition of the constrictor may result in dilation of the pupil. The dilation is controlled by the sympathetic nervous system while the constriction is controlled by the parasympathetic nervous system.

The human pupils typically contract just before the Rapid Eye Movement (REM) sleep phase starts and may also be conditioned by the Pavlovian conditioning. Changes in light intensity may affect the diameter of the pupil by up to 6-7 mm, double the basic size of the pupil which is about 3 mm. The average latency of the human pupillary response is about 140 milliseconds and the range varies highly in the range 220-500 milliseconds depending highly on the intensity and duration of the light signal. In addition, the pupillary response latency increases with age.

The pupil dynamics is controlled by brain processes, especially interesting and central is the Locus Coeruleus (LC). The LC is a central brain nucleus, connected to areas throughout the neuroaxis. Recent researches in the area of the neuronal circuits connected to the LC suggest that the LC plays a central role in the eye dynamics and controls several physiological functions. These include regulation of arousal and autonomous activity, resulting in major involvement in excitatory projections that involve the basal forebrain, thalamus, pedunculopontine and laterodorsal tegmental nucleus. These LC activations may be associated with the enhancement of alertness, changes in stress, excitation and similar. The importance of the LC in controlling autonomic functions projects, among others, on the dorsal motor nucleus of the vagus nerve, the salivatory nuclei, and the amygdala, which may be expressed in changes in the Heart Rate Variability (HRV) and external projections of fear, anxiety and/or stress. The LC activation produces increased activity in the sympathetic nervous system and decreased in parasympathetic nervous system which may be expressed via these projections. Changes in the LC activity may be further projected in neural networks activities and modifications throughout the brain, measured externally as changes in arousal and autonomic function.

The LC also communicates signals to the Thalamus and hypothalamus, which controls the dilating and construction muscles of the pupil. The LC thus changes the pupil dynamics in attention and memory, in behavioral flexibility and especially stress and may be highly correlated to emotions and/or slightly correlated to cognitive control. The LC is almost fully non-active in REM during sleep. The LC activity changes affect the pupil dynamic patterns as part of the activity changes of the sympathetic nervous system under a plurality of conditions, for example, fight or flight response, stress, clinical depression and anxiety, panic disorders, Parkinson and Alzheimer disease and more.

The changes in the sympathetic nervous system that may be controlled by the LC and projected in the eye dynamics may therefore provide means for externally monitoring, measuring and identifying brain processes. Monitoring and analyzing the properties of the eye and/or pupillary dynamics may therefore serve to extract signals that precede an unexpected, unusual, surprising and/or threatening event and enable fast and accurate inference to predict upcoming events. In particular, identifying eye dynamics signal patterns by analyzing the eye dynamics signal may be harnessed for predicting upcoming abnormal driving events which may be unusual, surprising, life and/or injury threatening and/or the like.

The profile generator 220 analyzing the images depicting the driver 204, specifically the eye(s) of the driver 204 may calculate the signal of the eye dynamics based on one or more parameters of the properties of the eye dynamics.

For example, the profile generator 220 may compute the eye dynamics signal according to a slope of change in the eye(s) movements of the eye measured by a first/second derivative, a magnitude of change in the eye(s) movements, i.e. an amplitude and/or intensity of the eye(s) and/or pupil(s) movements (squared/cubed) and an integration time duration. The profile generator 220 may compute the eye dynamics signal after applying one or more low pass and/or high pass filter to the signal to extract the frequency regions indicative of the brain processes projected via the eye dynamics. The profile generator 220 may further apply one or more filters to reduce and/or potentially remove noise effects in the eye dynamics signal. The profile generator 220 computes the eye dynamics signal by integrating the signal over a time interval defined by a sliding window applied to the signal, for example, a varying size window having of a time period duration of 0 to 8 seconds.

In another example, the profile generator 220 may compute the eye dynamics signal according to a distribution of frequencies of pupil fluctuations identified in the images of the eyes of the driver 204. For example, the profile generator 220 may compute the ratio between low frequencies of the pupil fluctuations in a range of 0 Hz to 0.08 Hz or 0.04 Hz to 0.15 Hz and the high frequencies in a range of 0.15 Hz to 0.8 Hz or 0.16 Hz to 0.4 Hz. The energy ratio expressed by the total energy in the low frequencies divided by the total energy in the high frequencies may be highly indicative of the brain activity where the higher the brain activity the higher is the total energy ratio.

The profile generator 220 may further apply weights to one or more of the parameters (slope, magnitude, integration time) to accurately map the contribution of each of the factor to the construction of a reliable and accurate eye dynamics signal preceding and hence predictive of one or more of the abnormal driving events.

The profile generator 220 may further apply one or more machine learning models and/or reinforcement machine learning models to create a signal model that the weights may be adjusted according to eye dynamics signals identified over time for the driver 204 and/or for other drivers 204, in particular drivers 204 sharing one or more common attributes and/or characteristics such as, for example, gender, age, driving experience, health and illness history and/or the like. Using the eyes dynamics signals identified for a large number of drivers 204 may naturally result in a reliable and acute signal model that may be highly predictive of one or more of the abnormal driving events.

Several experiments conducted to affirm and validate the correlation between the eye dynamics signal and upcoming abnormal driving events are described herein after.

Figure 3:
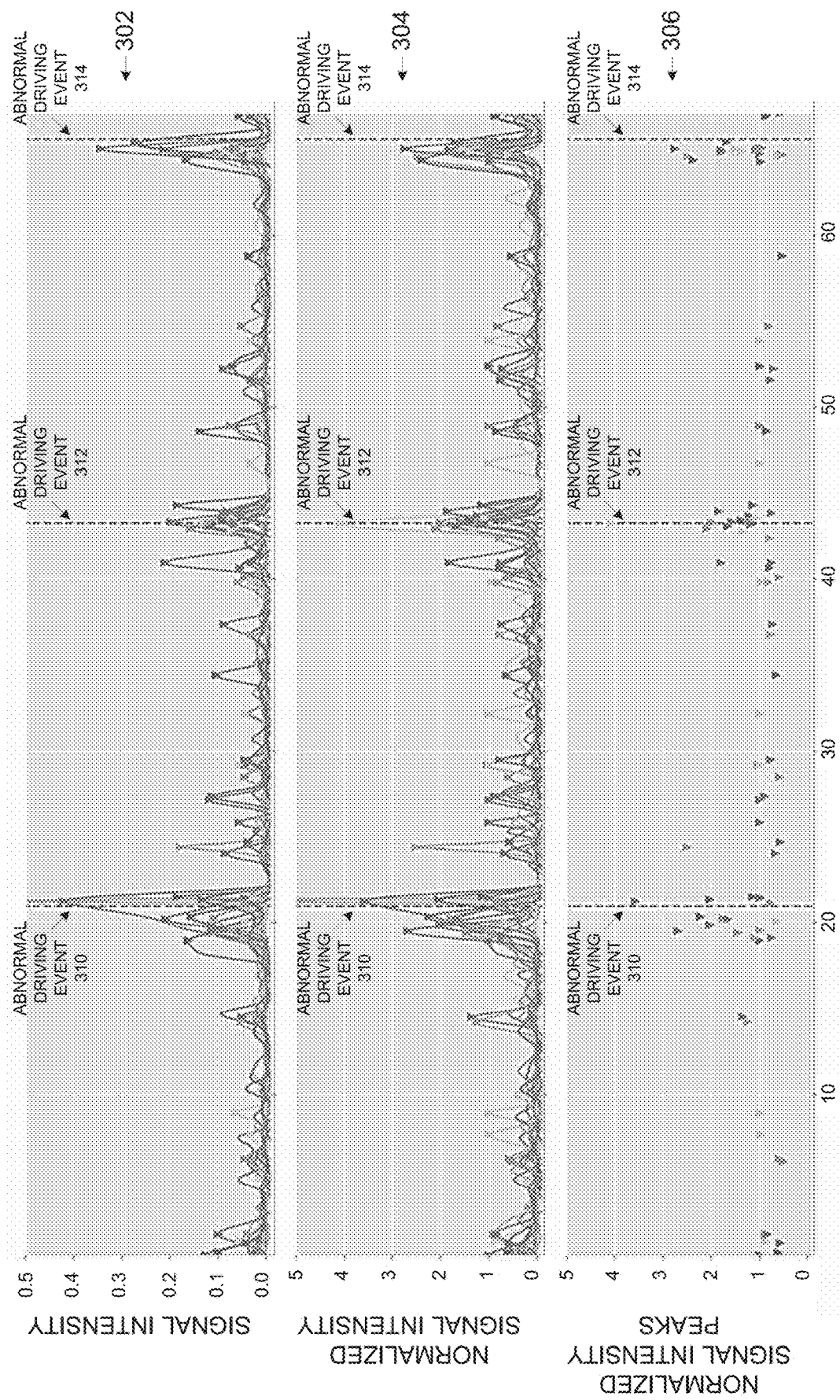
FIG. 3 presents graph charts of eye dynamics signals computed for a plurality of drivers encountered with abnormal driving events, according to some embodiments of the present invention.

Reference is now made to FIG. 3, which presents graph charts of eye dynamics signals computed for a plurality of drivers encountered with abnormal driving events, according to some embodiments of the present invention.

An imaging sensor such as the imaging sensor 230 was deployed to monitor and capture images of the eyes and pupils of a test group of 18 drivers 204 during a simulated driving session in a vehicle simulator controlled by a simulator such as the simulator 240 as described in 200B. The environment simulator 240 was operated to simulated several abnormal driving events among other driving events and driving scenarios. The abnormal driving events included, for example, a car accident in front of the simulated vehicle driven by the drivers 204, a lighting poll falling into the road on a path of the simulated vehicle driven by the drivers 204, a bicycle getting into dangerously close proximity of the simulated vehicle driven by the drivers 204 and/or the like.

A profile generator such as the profile generator 220 may apply an eye tracker for tracking the eye and/or pupil of the drivers 204 based on analysis of the images captured by the imaging sensor 230. The profile generator 220 may extract the eye dynamics of the drivers 204 during the simulated driving session and compute an eye dynamics signal for each of the drivers 204 as described herein before.

A graph chart 302 presents the eyes dynamics signal computed by the profile generator 220 for each of the drivers 204 where the X-axis indicates time (seconds) along the simulated session and the Y-axis indicates the intensity of the computed eye dynamics signals. The dashed vertical lines 310, 312 and 314 indicate occurrence of one of the abnormal driving events presented to the drivers 204 during the simulated driving session. In particular, the abnormal driving event 310 corresponds to a bicycle accident (collision), the abnormal driving event 312 corresponds to a poll falling down and the abnormal driving event 314 corresponds to a vehicle accident (collision).

As evident from the graph chart 302, while there may be some variance between the eye dynamics signals computed for the drivers 204, the eye dynamics signals substantially converge and follow a highly common pattern. Moreover, a clear correlation may be seen between the intensity of the eye dynamics signal and the abnormal driving events encountered by the drivers 204, specifically, the intensity of the eye dynamics signals increases significantly prior to the abnormal driving events and may precede the abnormal driving events by three seconds (average).

A graph chart 304 presents the eyes dynamics signals after normalized using standard statistical models for normalization. The X-axis indicates time (seconds) along the simulated session and the Y-axis indicates the normalized intensity of the computed eye dynamics signals.

A graph chart 306 presents only the peaks of the eyes dynamics signals which exceed a certain threshold level. The X-axis indicates time (seconds) along the simulated session and the Y-axis indicates the normalized intensity of the peaks.

In particular, the profile generator 220 may apply the threshold to extract the peaks of the eye dynamics signals and based on the peaks identify one or more patterns of the eyes dynamics signals computed for the drivers 204, in particular in correlation with the abnormal driving events. By applying the peaks extraction, the profile generator 220 may also identify typical eye dynamics signals corresponding to normal driving conditions and patterns with no abnormal driving events encountered by the drivers 204. The profile generator 220 may further establish the pattern(s) of the eyes dynamics signals correlating with the abnormal driving events compared to one or more reference pattern(s) of the eyes dynamics signals correlating to normal driving states and scenarios in which no abnormal driving events are encountered.

Figure 4:
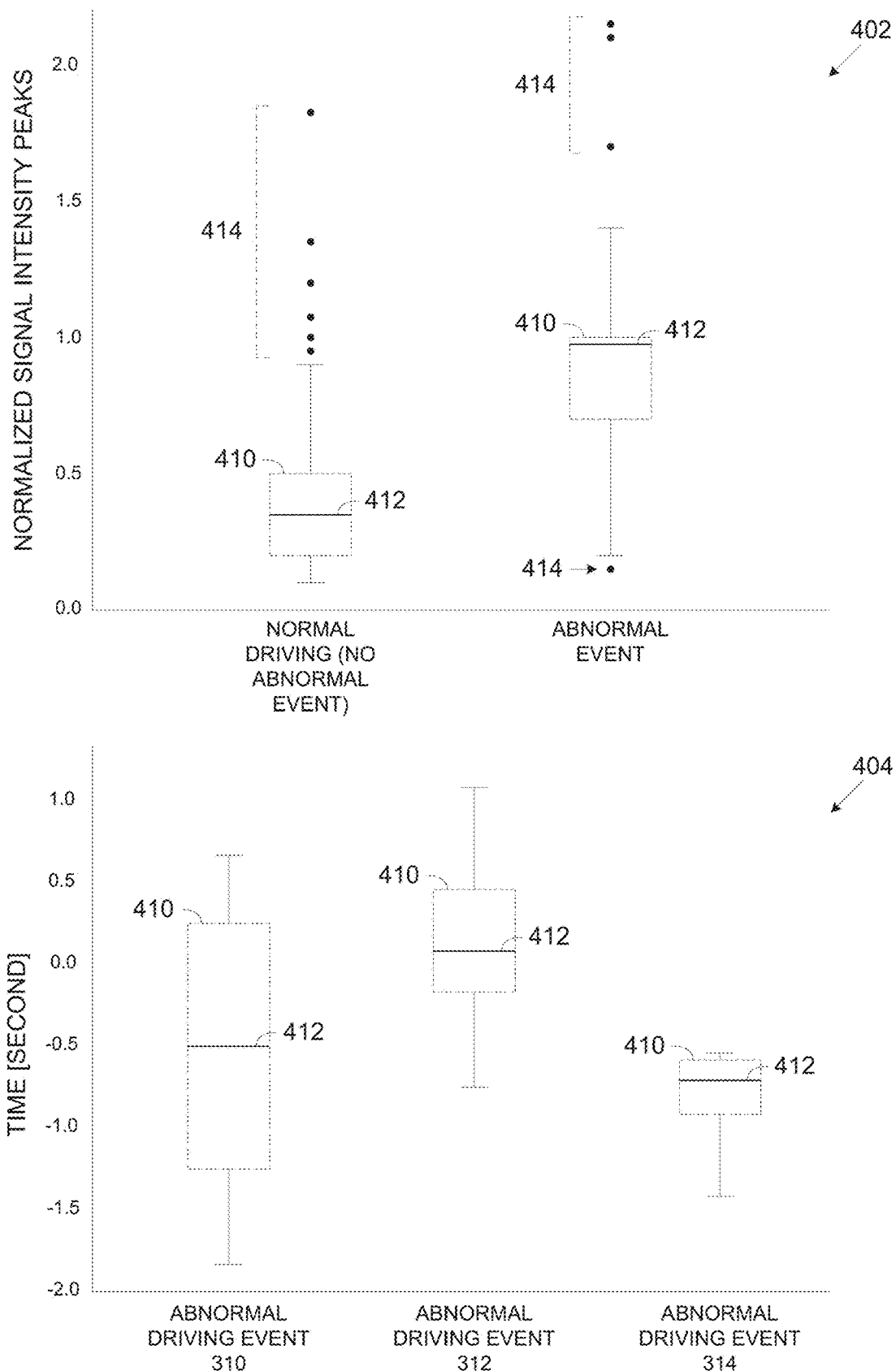
FIG. 4 presents charts of eye dynamics signals patterns identified for a plurality of drivers with relation to encountered abnormal driving events, according to some embodiments of the present invention.

Reference is also made to FIG. 4, which presents charts of eye dynamics signals patterns identified for a plurality of drivers with relation to encountered abnormal driving events, according to some embodiments of the present invention. A chart 402 presents the peaks of eye dynamics signal computed by the profile generator 220 for the plurality of drivers 204 of the test group that undergone the simulated driving session comprising normal driving scenarios and one or more abnormal driving events. The X-axis in the chart 402 is the driving event while the Y-axis is the intensity of the eye movement signal peaks.

As seen in the chart 402, for the normal driving, i.e. no abnormal driving event, over 90% of the peaks of the eye dynamics signal computed for the plurality of drivers 204 may be concentrated within the dashed line box 410 with intensity levels in the range of ~0.25 to 0.5. A median 412 of the plurality of normal driving peaks is ~0.3. While there may be a limited number of outliers 414 which may include peaks computed for some of the drivers 204, the crucial majority of the eye movement signal peaks may be confined to the very limited and well distinguished region within the box 410.

On the other hand, for the abnormal driving event, over 90% of the peaks of the eye dynamics signal computed for the plurality of drivers 204 may be concentrated within the dashed line box 410 with intensity levels in the range of ~0.7 to 1.0. The median 412 of the plurality of abnormal driving event peaks is ~0.95. Again, there may be a limited number of outliers 414 which may include peaks computed for some of the drivers 204. However, the crucial majority of the eye movement signal peaks may be confined to the very limited and well distinguished region within the box 410.

As evident from the chart 402, the profile generator 220 may be therefore able to clearly differentiate and distinguish the eye movement signal identified for normal driving from the eye movement signal identified to precede one or more of the abnormal driving events.

A chart 404 presents the distribution of eye dynamics signal peaks computed by the profile generator 220 for the plurality of drivers 204 of the test group that undergone the simulated driving session for the abnormal driving events 310 (bicycle collision), 312 (falling poll) and 314 (car collision). The X-axis in the chart 404 is the abnormal driving event while the Y-axis is time (seconds) where 0.0 seconds is the time of occurrence of the actual abnormal driving event.

The bicycle collision abnormal driving event 310 simulates a bicycle rider coming from the right into the path of the vehicle driven by the drivers 204. The drivers 204 may be unable to break in time or divert the path of the simulated vehicle ad hit the bicycle rider. As seen in the chart 404 the eye dynamics signal peaks computed for the plurality of drivers 204 may be contained in the box 410 which stretches across a relatively large time span between −1.3 to 0.2 seconds with the median 412 at ~0.45 seconds prior to the bicycle collision. As evident, the eye dynamics signal peaks expressing the brain activity of the drivers 204 significantly precede the bicycle collision abnormal driving event 310 since the bicycle may move relatively slow and may therefore enter the field of view of the drivers 204 a significant period of time before the actual collision. Hence the brain activity of the drivers 204 in response to the cues, signs and indications preceding the bicycle collision abnormal driving event 310 may pick up significantly long before the actual collision. Since the bicycle collision abnormal driving event 310 may be perceived by the drivers a significantly long time period prior to the actual event, the variance between the drivers 204 may also become significant as evident in the chart 404. The variance is due to differences between the drivers 204 in the processing time of the signs, cues and indications preceding the abnormal driving event. The differences in the processing time may be traced to one or more attributes, characteristics and/or conditions of the drivers 204, for example, age, physical and/or health condition (e.g. ADHD, etc.) and/or the like.

The falling poll abnormal driving event 310 simulates an event in which a lighting poll located at the side of a road along an upcoming path of the vehicle driven by the drivers 204 falls into the road. As seen in the chart 404 the eye dynamics signal peaks computed for the plurality of drivers 204 may be contained in the box 410 which stretches across a relatively small time span between −0.2 to 0.45 seconds with the median 412 at ~0.2 seconds after the falling poll heats the road. As evident, the eye dynamics signal peaks expressing the brain activity of the drivers 204 picks up very late with the average and median peaks 412 detected after the falling poll heats the road. This may result from the fact that the drivers 204 may be typically focused on the horizontal plane at the vehicle level thus unable to notice the cues, signs and indications preceding the falling poll abnormal driving event 312 which are above the horizontal plane and are therefore not directly in the field of view of the drivers 204. As such the drivers 204 may observe and become aware of the falling poll only when it is significantly low and enters their field of view which may be just before the poll heats the road. The variance of the eye dynamics signal peaks may be relatively low since the duration of the entire falling poll abnormal driving event 312 after detected by the drivers 204 may be significantly short.

The vehicle (car) collision abnormal driving event 314 simulates another car which does not stop at a red traffic light and enters an intersection into which the simulated vehicle driven by the drivers 204 also enters in a green light and crashes into the simulated vehicle driven by the drivers 204. As seen in the chart 404 the eye dynamics signal peaks computed for the plurality of drivers 204 may be contained in the box 410 which stretches across a very short time span between −0.9 to −0.2 seconds with the median 412 at ~0.4 seconds prior to the car collision. As evident, the eye dynamics signal peaks expressing the brain activity of the drivers 204 slightly precede the car collision abnormal driving event 310. This may be due to the other car that may enter the intersection significantly fast while the brain of the drivers 204 may not expecting the other car to ignore the red light and enter the intersection and therefore the brain activity picks up only shortly before the actual collision. The variance of the eye dynamics signal peaks may be significantly low since the duration of the entire car collision abnormal driving event 312 from the time of noticing the other car to the time of collision may be significantly short.

Based on the eye dynamics signal computed and correlated with one or more of the abnormal driving events, the profile generator 220 may create one or more eye dynamics signal patterns correlated with the respective abnormal driving event(s). Moreover, the eye dynamics signal patterns created by the profile generator 220 may be specifically associated with one or more parameters and/or characteristics of the respective abnormal driving event(s). For example, in case of a car collision abnormal driving event, the car collision may relate to a car approaching in front, from the right side, from the left side and/or the like. Each of these scenarios of the car collision abnormal car collision may be expressed by a different eye dynamics signal pattern and may thus be associated accordingly by the profile generator 220 with the respective abnormal driving event. In another example, in case of the car collision abnormal driving event, the car collision may relate to a car approaching at different speeds where each of these speed scenarios may be expressed by a different eye dynamics signal pattern and may thus be associated accordingly by the profile generator 220 with the respective abnormal driving event.

Optionally, the profile generator 220 applies one or more trained ML models (e.g. a neural network, an SVM, etc.) to the images captured by the imaging sensor(s) 230 during the training session to identify one or more eye dynamics signal patterns in association with one or more of the abnormal driving events associated and correlated in time with the captured images of the eyes of the driver 204. The trained ML model(s) may employ one or more training and learning methodologies, for example, supervised learning, semisupervised learning, unsupervised learning, reinforced learning and/or a combination thereof.

Reference is made once again to FIG. 1.

As shown at 108, the profile generator 220 may update the response profile 222 of the driver 204 with the response pattern(s) identified for the driver 204 in correlation with the respective abnormal driving events.

Since the responses of human individuals may highly vary from one driver 204 to another, the profile generator 220 may adjust the response profile 222 of each driver 204 according to the response pattern(s) specifically identified for the respective driver 204 thus creating and/or updating a specifically customized response profile 222 individualized for each driver 204.

The response timing may vary among different drivers 204 due to one or more characteristics of the drivers 204 such as, for example, physiological parameters, cognitive abilities, age, physiological history, medical features, pathologies and/or the like. The profile generator 220 may therefore adjust the response profile 222 of the driver 204 to reflect one or more of the characteristics of the driver 204.

Moreover the response time of the driver 204 may vary over time due to one or more driver state attributes which may change across time, for example, a mental state (e.g. alertness, engagement, stress, perception, etc.), a mental load, a physiological state (e.g. fatigue, sensory deficiencies such as low vision/hearing/motion abnormalities), emotional state and/or the like. The profile generator 220 may analyze the images captured during one or more of the training session(s) which depict the eyes of the driver 204 to identify one or more properties of the eye dynamics indicative of the driver state attribute(s) of the driver 204 which may change across time. For example, the fluctuations of the pupil(s) of the driver 204 as detected by analyzing the images depicting the eyes of the driver 204 may be highly indicative of the driver state, specifically the physiological state of the driver 204, the cognitive state of the driver 204, the emotional state of the driver 204 and/or the like. The profile generator 220 may then adjust the response profile 222 of the driver to reflect one or more of the driver state attributes as detected during the training session(s).

Optionally, the profile generator 220 updates the response profile 222 of the driver 204 according to one or more eye dynamics signal patterns identified for one or more other drivers 204. In particular, the profile generator 220 may update the response profile 222 of the driver 204 according to eye dynamics signal pattern(s) identified for other driver(s) 204 sharing one or more common attributes and/or characteristics, for example, gender, age, driving experience, health and illness history and/or the like.

The profile generator 222 may further collect eye dynamics signals for a plurality of drivers 204 over time, i.e. over a plurality of training sessions and/or a plurality of real world drives during which the eye dynamics signals may be correlated and associated with abnormal driving events. Based on the eye dynamics signals and patterns collected over time for a plurality of drivers 204, the profile generator 222 may create and/or update one or more representative response profiles 222 aggregated for one or more driver segments. The profile generator 222 may create and/or update the representative response profile(s) 222 according to one or more of the common attributes and/or characteristics such as gender, age, driving experience, health and illness history and/or the like shared by the drivers 204 of the respective segments. For example, the profile generator 222 may create and/or update a segment response profile 222 for a generic young driver in the age range of 22-25 having high physiological and/or mental abilities but a relatively short driving experience. In another example, the profile generator 222 may create and/or update a segment response profile 222 for a generic older driver in the age range of 55-65 having reduced physiological and/or mental abilities but a relatively long driving experience.

The collected eye dynamics signals and patterns may further serve for one or more ML models applied to build network of drivers/vehicles to generate a mixed net of perceiving humans and perceiving machines based on data from both human senses and machine senses for optimal self-organizing systems of multiple vehicles/human-passengers. Different types of expertise in human drivers 204 may result in different types of response profiles 222, for example, an expert driver response profile 222, a novice driver response profile 222, a laymen driver response profile 222 and/or the like each with its descriptive factors and measures. Applying the ML model(s) trained with response profile(s) 222 created for an expert driver 204 to a non-expert driver profile 222 may enable converting the non-expert driver into an expert driver.

As shown at 110, the profile generator 220 may output and/or provide to one or more control systems the response profile 222 of one or more of the drivers 204 created and/or updated and/or information based on the response profile 222 of one or more of the drivers 204. For example, the response profile 222 of one or more of the drivers 204 created and/or updated and/or information based on response profile 222 of one or more of the drivers 204 created and/or updated may be stored in memory for the control systems to access it, may be transmitted to the control systems using a communication device, may be provided through an external device, and so forth.

Further, in some examples, the provided response profile 222 of one or more of the drivers 204 and/or information based on the response profile 222 of one or more of the drivers 204 may be use in real-time by one or more of the control systems which may initiate one or more vehicle control actions to automatically control the operation of an at least partially autonomous vehicle. The response profile 222 may be used to instrument a Brain-Machine Interface (BMI) between the driver 204 and the control system which bypasses the brain's normal neural pathways of peripheral nerves and muscles. The BMI may facilitate a fast and direct path between the driver's brain and the control system(s) thus enabling the control system(s) to predict one or more of the abnormal driving events and initiate one or more actions accordingly.

Figure 5:
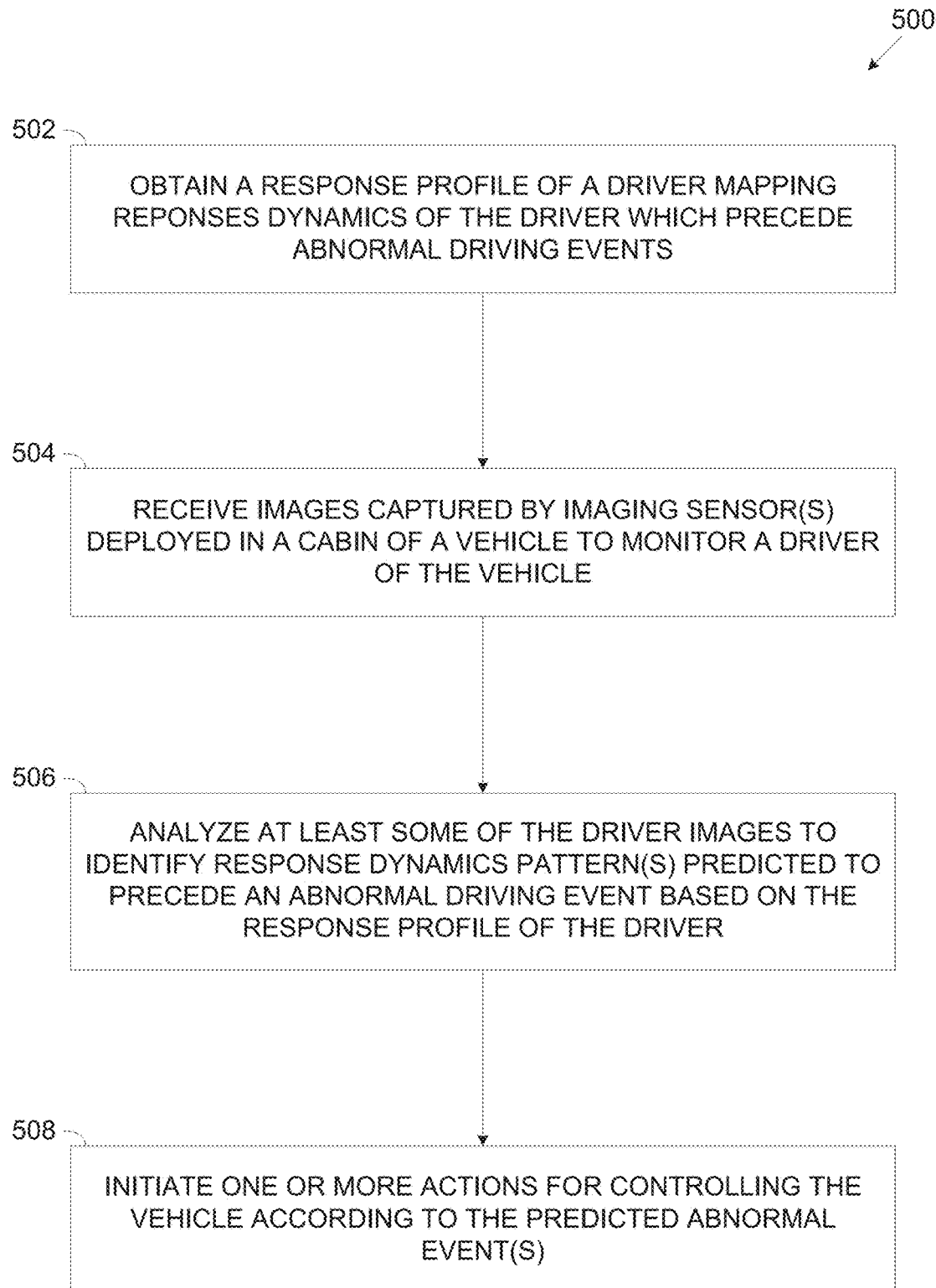
FIG. 5 is a flowchart of an exemplary process of initiating vehicle control actions according to abnormal events predicted by analyzing driver's response dynamics based on a response profile of the driver mapping the driver's response dynamics preceding abnormal driving events, according to some embodiments of the present invention.

Reference is now made to FIG. 5, which is a flowchart of an exemplary process of initiating vehicle control actions according to abnormal events predicted by analyzing driver's response dynamics based on a response profile of the driver mapping the driver's response dynamics preceding abnormal driving events, according to some embodiments of the present invention. An exemplary process 500 may be executed by one or more control systems controlling the operation of an at least partially autonomous vehicle, in particular a ground vehicle such as, for example, a car, a bus, a truck and/or the like driven by a driver such as the driver 204. The control system may monitor, in real-time during the ride, the bodily dynamics of the driver 204, in particular the eye dynamics and may compute an eye dynamics signal which may be analyzed based on a response profile such as the response profile 222 of the driver 204 to predict one or more of the abnormal driving events and take one or more vehicle control actions to control the vehicle accordingly.

Figure 6:
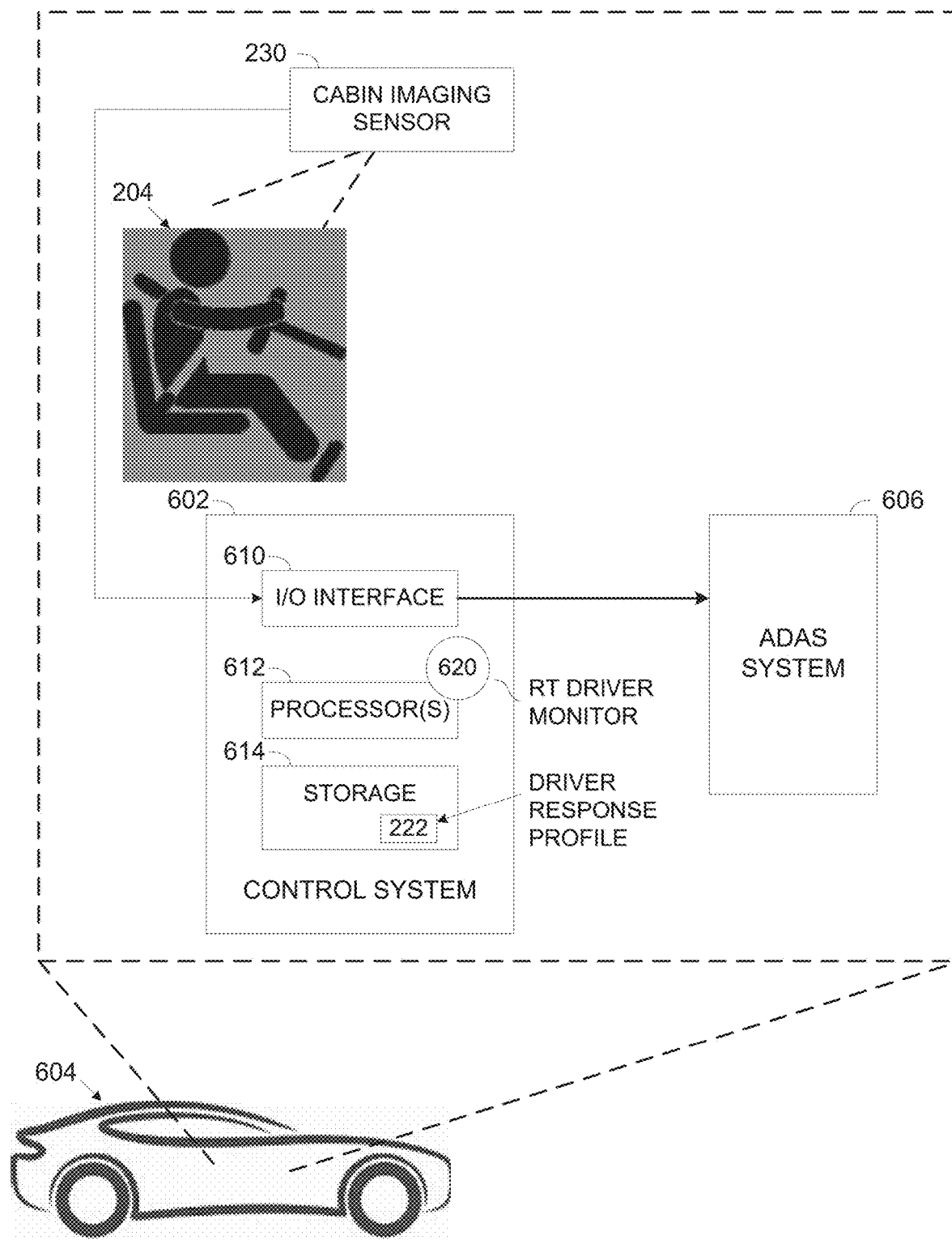
FIG. 6 is a schematic illustration of an exemplary system for initiating vehicle control actions according to abnormal events predicted by analyzing driver's response dynamics based on a response profile of the driver mapping the driver's response dynamics preceding abnormal driving events, according to some embodiments of the present invention.

Reference is also made to FIG. 6, which is a schematic illustration of an exemplary system for initiating vehicle control actions according to abnormal events predicted by analyzing driver's response dynamics based on a response profile of the driver mapping the driver's response dynamics preceding abnormal driving events, according to some embodiments of the present invention.

An exemplary control system 602 may be deployed in an at least partially autonomous vehicle 604 having one or more vehicle control systems, for example, an Advanced Driver Assistance Systems (ADAS) 606 configured to control automatically the operation of the at least partially autonomous vehicle 604, for example, steering, accelerating, decelerating, breaking and/or the like. The control system 602 may include an Input/Output (I/O) interface 610 such as the I/O interface 210, a processor(s) 612 such as the processor(s) 212 for executing the process 500 and storage 614 such as the storage 214 for storing code (program store) and/or data.

Via the I/O interface 610, the control system 602 may communicate with one or more imaging sensors such as the imaging sensor 230 deployed in a cabin of the vehicle 604 to monitor a driver 204 driving and/or riding (passenger) in the vehicle 604. In particular, the imaging sensor(s) 230 may be deployed to monitor the face and optionally the upper body of the driver 204. As such, images captured by the imaging sensor(s) 230 may depict (portray) one or more eyes of the driver 204, face of the driver 204, one or more limbs (specifically hands) of the driver 204 and/or the upper body section of the driver 204 (e.g. waist and/or shoulders up).

The processor(s) 612 may execute one or more software modules such as, for example, a process, a script, an application, an agent, a utility, a tool, an Operating System (OS) and/or the like each comprising a plurality of program instructions stored in a non-transitory medium (program store) such as the storage 614 and executed by one or more processors such as the processor(s) 612. For example, the processor(s) 612 may execute a Real-Time (RT) driver monitor software module 620 for executing the process 500 to predict one or more abnormal driving events based on a response profile of the driver 204 such as the response profile 222 locally stored in the vehicle 604, for example, in the storage 614. The RT driver monitor 620 may optionally utilize one or more hardware elements for executing the process 500 and/or part thereof. Such hardware elements may include, for example, a circuit, a component, an IC, an ASIC, an FPGA, a DSP, a GPU and/or the like.

The RT driver monitor 620 may communicate with one or more of the ADAS 606 via the I/O interface 610. Optionally, the control system 602 may be integrated with one or more of the ADAS 606 such that the integrated system executes the RT driver monitor 620.

As shown at 502, the process 500 starts with the RT driver monitor 620 obtaining the response profile 22 of the driver 204, for example, retrieving the response profile 222 from the storage 214. The response profile 222 may be a specific response profile 222 specifically created and/or updated for the driver 204. However, the response profile 222 may be a representative response profile 222 aggregated for a plurality of drivers 204 sharing one or more common attributes and/or characteristics.

As shown at 504, the RT driver monitor 620 may receive a plurality of images captured by the imaging sensor(s) 230 deployed in the cabin of a vehicle 604 to monitor the driver 204, in particular the face and upper body portion of the driver 204. As such the driver images may depict the face of the driver 204, one or more eyes of the driver 204, the head of the driver 204, one or more limbs, in particular hands of the driver 204 and/or the upper body segment of the driver 204 (e.g. waist up, shoulders up, etc.).

As shown at 506, the RT driver monitor 620 may analyze in real-time at least some of the images depicting the driver 204 which may be captured by the imaging sensor(s) 230 during a drive of the driver 204 in the vehicle 604. Based on the analysis of the images, the RT driver monitor 620 may extract the bodily dynamics identofoe4d in the images, in particular the eye and/or pupil dynamics.

The RT driver monitor 620 may further compute the signal for the eye dynamics extracted from the images depicting the eyes of the driver 204 as described herein before in step 106 of the process 100.

The RT driver monitor 620 may analyze the eye dynamics signal with respect to one or more eye dynamics signal patterns which were estimated during the training session (process 100) to precede one or more of the abnormal driving events. Specifically, the RT driver monitor 620 compares between the eye dynamics signal computed in real-time for the driver 204 and the eye dynamics signal pattern(s) included in the response profile 222 of the driver In case of a match of the real-time eye dynamics signal with a certain eye dynamics signal pattern, the RT driver monitor 620 may estimate that one of the one or more abnormal driving events associated with the certain matching eye dynamics signal pattern may be about to occur.

As described herein before, the response pattern(s) included in the response profile 222 may primarily relate to patterns of eye and/or pupil dynamics bio markers. However, the response pattern(s) may relate to one or more other response dynamics expressed by other bio markers, for example, a facial expression, a limb gesture, a bodily gesture and a body pose. While the description herein after is focused on eye and pupil dynamics bio markers as an exemplary embodiment it should not be construed as limiting since similar methods and techniques may be applied to one or more of the other response dynamics such as the facial expressions, the limb gestures, the bodily gestures and/or the body poses.

As shown at 508, the RT driver monitor 620 may initiate one or more vehicle control actions to control the vehicle 604 according to the abnormal driving event predicted to occur which may be associated with the eye dynamics signal pattern matching the real-time eye dynamics signal. As the eye dynamics signal may precede the associated abnormal driving event(s) by about 0-3 seconds, the RT driver monitor 620 may initiate the vehicle control action(s) well in advance to the actual occurrence of the associated abnormal driving event and may thus prevent it and/or reduce its impact and/or effects.

For example, in case the predicted abnormal driving event is a car collision, the RT driver monitor 620 may communicate with the ADAS 606 to initiate a breaking action to stop the vehicle 604. In another example, assuming the predicted abnormal driving event is a car collision with a car approaching from the front of the vehicle 604. In such case the RT driver monitor 620 may communicate with the ADAS 606 to initiate a steering action to steer the vehicle 604 away from the projected path of incoming car.

Optionally, the RT driver monitor 620 analyzes the images depicting the driver 204, in particular the eyes of the driver to identify one or more properties of the eye dynamics indicative of one or more of the driver state attributes of the driver 204, for example, the mental state (e.g. alertness, engagement, stress, perception, etc.), the mental load, the physiological state (e.g. fatigue, sensory deficiencies, etc.), the emotional state and/or the like. The RT driver monitor 620 may further adjust one or more of the initiated actions according to one or more of the detected driver state attributes. For example, in case based on the identified driver state attribute(s), the RT driver monitor 620 may determine that the driver 204 is in a high alertness state, the RT driver monitor 620 may estimate that the eye dynamics signal significantly precedes the associated abnormal driving event. In such case, the RT driver monitor 620 may have more time to initiate and/or complete the initiated vehicle control action(s). In contrast, in case based on the identified driver state attribute(s), the RT driver monitor 620 may determine that the driver 204 is in a low alertness state, the RT driver monitor 620 may estimate that the eye dynamics signal significantly lags the normal reaction and the associated abnormal driving event is expected in a very short time. In such case, the RT driver monitor 620 may initiate one or more significantly more drastic actions to prevent the abnormal driving event and/or reduce its impact and effect.

Optionally, the RT driver monitor 620 analyzes one or more images of the driver 204 captured following initiation of one or more first vehicle control actions initiated by the RT driver monitor 620 according to the predicted abnormal driving event. Based on the analysis, the RT driver monitor 620 may extract and compute the eye dynamics signal projecting the brain processes of the driver 204 in response to the first vehicle control action(s) to identify the driver state attributes of the driver 204 following the first vehicle control action(s). For example, assuming that the RT driver monitor 620 initiated a turning maneuver of the vehicle 604 based on a predicted car collision abnormal driving event. Further assuming that in response to the turning maneuver, the driver state attribute(s) of the driver 204 indicates an increased stress, fear, anxiety and/or the like. In such case the RT driver monitor 620 may determine that the abnormal driving event is not avoided and may thus initiate one or more second vehicle control actions in attempt to prevent the abnormal driving event and/or reduce its impact and effect. Moreover, the RT driver monitor 620 analyzing the eye dynamics signal detected for the driver 204 following the first vehicle control action(s), the RT driver monitor 620 may detect a match of this eye dynamics signal with another eye dynamics signal pattern retrieved from the response profile 222. In such case the RT driver monitor 620 may initiate the second vehicle control action(s) according to the abnormal driving event associated with the abnormal driving event associated with the other eye dynamics signal pattern.

Optionally, the RT driver monitor 620 applies one or more ML models, for example, reinforcement learning ML models to the detected eye dynamics signal detected in response to the vehicle control action(s) initiated by the RT driver monitor 620 in order to further enhance the response profile 222 of the driver 204 according to the additional collected eye dynamics data. Based on the enhanced response profile 222, the RT driver monitor 620 may initiate future vehicle control action(s) during one or more future predicted abnormal driving events to more accurately address and potentially mitigate these abnormal driving events.

In some embodiments, one or more images may be analyzed to identify at least one eye dynamics signal pattern. For example, a machine learning model may be trained using training samples to identify one or more eye dynamics signal patterns from images and/or videos. The trained machine learning model may be applied to analyze one or more of the images depicting the eye(s) of the driver 204 to identify one or more of the eye dynamics signal patterns. Such training sample may comprise a group of images together with desired identification of eye dynamics signal pattern and/or an indication of a lack of a desired identification of an eye dynamics signal pattern. In another example, an artificial neural network may be configured to identify eye dynamics signal pattern(s) from images and/or videos, and the artificial neural network may be used to analyze one or more of the images depicting the driver 204 and identify one or more of eye dynamics signal patterns.

In some embodiments, one or more identified eye dynamics signal patterns may be used to predict one or more imminent abnormal driving events. For example, a response profile 222 of the driver 204 may associate eye dynamics signal patterns with likely imminent abnormal driving events. The identified eye dynamics signal pattern(s) may be used to access the response profile 222 of the driver 204 and retrieve a likely imminent abnormal driving event to be predicted. In another example, a machine learning model may be trained using training samples to predict likely imminent abnormal driving events based on eye dynamics signal patterns. The trained machine learning model may be used to analyze one or more of the identified eye dynamics signal patterns and predict respective likely imminent abnormal driving event. Such training sample may comprise eye dynamics signal pattern associated with an indication of a desired prediction of a likely imminent abnormal driving event(s). In yet another example, an artificial neural network may be configured to predict likely imminent abnormal driving events based on eye dynamics signal patterns. The artificial neural network may be used to analyze one or more of the identified eye dynamics signal patterns and predict respective likely imminent abnormal driving event(s).

In some embodiments, a method for updating response profiles 222 of drivers 204 is presented. In some examples, a plurality of images may be received, such as images captured by imaging sensor(s) 230 deployed to monitor the eye(s) of a driver 204 of a vehicle 604 (for example as described above, for example in relation to 102 and/or 504).

Further, in some examples, at least some of the plurality of images may be analyzed to identify one or more eye dynamics signal patterns preceding one or more abnormal driving events occurring in an environment of the vehicle 604 (for example as described above, for example in relation to 106). Further, in some examples, the response profile 222 of the driver 204 may be updated using one or more of the identified eye dynamics signal patterns (for example as described above, for example in relation to 108). Further, in some examples, information based on the updated response profile 222 of the driver 204 may be provided, and in some examples the provided information may be configured to enable one or more control systems such as the control system 602 of the vehicle 604 to predict an imminent abnormal driving event based on an eye dynamics signal of the driver (for example as described above, for example in relation to 110 and/or 500).

In some embodiments, at least some of the plurality of images may be analyzed to identify one or more additional eye dynamics signal patterns succeeding one or more of the abnormal driving events (for example as described above, for example in relation to 106). Further, in some examples, in response to the identified at least one additional eye dynamics signal pattern occurring within a selected time window after the at least one abnormal driving event, updating the response profile 222 of the driver 204 using the identified at least one eye dynamics signal pattern may be withheld and/or forwent.

Further, in some examples, in response to the identified at least one additional eye dynamics signal pattern occurring within a first selected time window after the at least one abnormal driving event, a first update to the response profile 222 of the driver 204 using the identified at least one eye dynamics signal pattern may be made, and in response to the identified at least one additional eye dynamics signal pattern occurring within a second selected time window after the at least one abnormal driving event, a second update to the response profile 222 of the driver 204 using the identified at least one eye dynamics signal pattern may be made, where the first update differs from the second update and the first selected time window differs from the second selected time window.

In some embodiments, in response to the identified at least one eye dynamics signal pattern occurring within a selected time window prior to the at least one abnormal driving event, updating the response profile 222 of the driver 204 using the identified at least one eye dynamics signal pattern may be withheld and/or forwent. In some examples, in response to the identified at least one eye dynamics signal pattern occurring within a first selected time window prior to the at least one abnormal driving event, a first update to the response profile 222 of the driver 204 may be made, and in response to the identified at least one eye dynamics signal pattern occurring within a second selected time window prior to the at least one abnormal driving event, a second update to the response profile of the driver may be made, where the second update differs from the first update and the second selected time window differs from the first selected time window.

Correlating one or more of the identified eye dynamics signal patterns with their time of detection with respect to the abnormal driving event(s) they precede may serve to infer a probability of relevance and/or relation of the identified eye dynamics signal pattern(s) and the respective abnormal driving event(s). For example, assuming a first eye dynamics signal pattern is identified more than 10 seconds prior to a certain abnormal driving event, it is likely that this first eye dynamics signal pattern is not related to the certain abnormal driving event and may therefore be ignored, i.e. not updated in the response profile 222. Further assuming a second eye dynamics signal pattern is identified during a period of 3 to 10 seconds prior to the certain abnormal driving event. The second eye dynamics signal pattern may be related to the certain abnormal driving event with higher probability and the response profile 222 of the driver 204 may be updated accordingly, for example, with a low value weight. However, a third eye dynamics signal pattern which is identified during a period of 0.2 to 3 seconds prior to the certain abnormal driving event may be highly related and indicative of the certain abnormal driving event and may be updated accordingly in the response profile 222 of the driver 204, for example, with a high value weight. Moreover, assuming a fourth eye dynamics signal pattern is identified during a period of less than 0.2 seconds prior to the certain abnormal driving event, it may also be deemed as unrelated to the certain abnormal driving event since it may be below the response time of a human (i.e. the driver 204) and may be therefore ignored and not updated in the response profile 222 of the driver 204.

In some embodiments, the at least one imaging sensor 230 deployed to monitor at least one eye of a driver 204 of a vehicle 604 (as described above) may comprise at least one of an infrared imaging sensor, a thermal imaging sensors, a visible light imaging sensor, a near infrared imaging sensor, a structured light imaging sensor, a time of flight imaging sensor, a stereo imaging sensor, a depth imaging sensor, and so forth.

In some embodiments, the plurality of images described above (for example in relation to method 100, method 500, etc.) may be captured during drive simulations presented to the driver 204 (for example as described above, for example in relation to FIG. 2B). In some embodiments, the plurality of images described above (for example in relation to method 100, method 500, etc.) may be captured during real world drives of the driver in a vehicle (for example as described above, for example in relation to FIG. 2A).

In some embodiments, the at least one eye dynamics signal pattern described above (for example in relation to 106 and/or 506) may describe eye dynamics which is a member of a group consisting of: a dilatation level of a pupil of the at least one eye, a contraction level of the pupil of the at least one eye, a pupillary response time of a pupil of the at least one eye, a frequency of movement of the at least one eye, a gaze vector of the at least one eye and a saccade.

In some embodiments, the at least one abnormal driving event described above (for example in relation to 106 and/or 506 and/or 508) may include at least one of: a surprising event, an unusual event, a potential collision event, a potential life threatening event, and a potential injury damage event.

In some embodiments, the response profile of the driver may be updated according to at least one other response profile created for at least one other driver sharing at least one common attribute with the driver, for example as described above.

In some embodiments, the response profile of the driver may be updated to associate the at least one abnormal driving event with at least one other dynamics pattern of the driver identified to precede the at least one abnormal driving event, for example as described above. In some examples, the at least one other dynamics pattern may be identified based on at least one of: a facial expression of the driver, a limb gesture of the driver, a bodily gesture of the driver and a body pose of the driver, for example as described above.

In some embodiments, the response profile of the driver may be updated based on at least one driver state parameter that may be derived from an analysis of fluctuations of a pupil of the at least one eye detected in the at least some of the plurality of images, for example as described above. In some examples, the at least one driver state parameter may be indicative of at least one of: a physiological state of the driver, a cognitive state of the driver and an emotional state of the driver.

In some embodiments, a method for automatically controlling vehicles according to response profiles of drivers is provided. In some examples, a plurality of images may be received, such as images captured by at least one imaging sensor deployed to monitor at least one eye of a driver of a vehicle (for example as described above, for example in relation to 102 and/or 504). Further, in some examples, at least some of the plurality of images may be analyzed to identify at least one eye dynamics signal pattern (for example as described above, for example in relation to 106 and/or 506). Further, in some examples, the identified at least one eye dynamics signal pattern may be used to predict at least one imminent abnormal driving event, for example based on a response profile of the driver (for example as described above, for example in relation to 506 and/or 508). Further, in some examples, at least one action for controlling the vehicle according to the predicted at least one abnormal driving event may be initiated (for example as described above, for example in relation to 508).

In some embodiments, a second plurality of images captured by the at least one imaging sensor after the identification of the at least one eye dynamics signal pattern may be received, for example similarly to what described above, for example in relation to 102 and 504. Further, in some examples, at least some of the second plurality of images may be analyzed to identify at least one additional eye dynamics signal pattern, for example as described above. Further, in some examples, an elapsed time between an occurrence of the at least one eye dynamics signal pattern and an occurrence of the at least one additional eye dynamics signal pattern. In some examples, in response to a first calculated elapsed time, at least one additional action for controlling the vehicle may be initiated, and in response to a second calculated elapsed time, initiating the at least one additional action for controlling the vehicle may be withheld and/or forwent, where the second calculated elapsed time is shorter than the first calculated elapsed time. In some examples, in response to a first calculated elapsed time, at least one first additional action for controlling the vehicle may be initiated, and in response to a second calculated elapsed time, at least one second additional action for controlling the vehicle may be initiated, where the second calculated elapsed time is shorter than the first calculated elapsed time and the at least one first additional action differs from the at least one second additional action.

In some embodiments, the at least one action initiated to control the vehicle as described above may be adjusted according to at least one of: a physiological state of the driver, a cognitive state of the driver and an emotional state of the driver, for example as described above.

In some embodiments, the at least one abnormal driving event may be determined according to at least one other dynamics pattern predicted to precede the at least one abnormal driving event in the response profile of the driver, for example as described above. For example, the at least one other dynamics pattern may be identified based on at least one of: a facial expression of the driver, a limb gesture of the driver, a bodily gesture of the driver and a body pose of the driver.

In some embodiments, at least one second action for controlling the vehicle may be initiated according to a response of the driver to the at least one action, for example as described above. In some examples, the response of the driver may be determined according to an analysis of at least one image captured by the at least one imaging sensor after the at least one action is initiated.

In some embodiments, a non-transitory computer readable medium may store a software program comprising data and/or computer implementable instructions for carrying out any of the methods and/or steps and/or procedures and/or techniques described above.

In some embodiments, a system may comprise at least one processor (for example as described above), and the at least one processor may be configured to carry out any of the methods and/or steps and/or procedures and/or techniques described above.

It is expected that during the life of a patent maturing from this application many relevant systems, methods and computer programs will be developed and the scope of the terms eye tracking and/or machine learning are intended to include all such new technologies a priori.

As used herein the term "about" refers to +10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the embodiments described herein have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the embodiments described herein. To the extent that section headings are used, they should not be construed as necessarily limiting. In addition, any priority document(s) of this application is/are hereby incorporated herein by reference in its/their entirety.

What is claimed is:

1. A method for updating response profiles of drivers used in automated vehicle control, the method comprising:

operating for capturing a plurality of images thereby at least one imaging sensor deployed to monitor at least one eye of a driver of a vehicle;

receiving and analyzing at least some of the plurality of images to identify at least one eye dynamics signal pattern preceding at least one abnormal driving event occurring in an environment of the vehicle, the at least one eye dynamics signal pattern is identified according to a function of a change in frequencies of pupil fluctuations over time, wherein values of the function are determined using an energy ratio between frequencies in different ranges;

updating a response profile of the driver based on an association of the at least one abnormal driving event and the identified at least one eye dynamics signal pattern; and communicating with at least one control system of the vehicle for providing thereto information based on the updated response profile of the driver, the provided information is configured to enable the at least one control system of the vehicle to predict an imminent abnormal driving event based on an eye dynamic signal pattern of the driver, wherein the at least one control system is adapted for initiating at least one action for controlling the vehicle according to the imminent abnormal driving event predicted.

2. The method of claim 1, further comprising:

analyzing at least some of the plurality of images to identify at least one additional eye dynamics signal pattern succeeding the at least one abnormal driving event; and in response to the identified at least one additional eye dynamics signal pattern occurring within a selected time window after the at least one abnormal driving event, forgoing updating the response profile of the driver using the identified at least one eye dynamics signal pattern.

3. The method of claim 1, further comprising:
in response to the identified at least one eye dynamics signal pattern occurring within a first selected time window prior to the at least one abnormal driving event, making a first update to the response profile of the driver; and
in response to the identified at least one eye dynamics signal pattern occurring within a second selected time window prior to the at least one abnormal driving event, making a second update to the response profile of the driver, wherein the second update differs from the first update and the second selected time window differs from the first selected time window.

4. The method of claim 1, further comprising, in response to the identified at least one eye dynamics signal pattern occurring within a selected time window prior to the at least one abnormal driving event, forgoing updating the response profile of the driver using the identified at least one eye dynamics signal pattern.

5. The method of claim 1, wherein the at least one imaging sensor comprises at least one of: an infrared imaging sensor and a thermal imaging sensor.

6. The method of claim 1, wherein the plurality of images is captured during a member selected from the group consisting of: drive simulations presented to the driver; and real world drives of the driver in a vehicle.

7. The method of claim 1, wherein the at least one eye dynamics signal pattern describes eye dynamics which is a member of a group consisting of: a dilatation level of a pupil of the at least one eye, a contraction level of the pupil of the at least one eye, a pupillary response time of a pupil of the at least one eye, a frequency of movement of the at least one eye, a gaze vector of the at least one eye and a saccade.

8. The method of claim 1, wherein the at least one abnormal driving event includes at least one of: an environment change event, an irregular traffic behavior event, an object falling event, a potential collision event, a potential life threatening event, and a potential injury damage event.

9. The method of claim 1, further comprising updating the response profile of the driver according to at least one other response profile created for at least one other driver sharing at least one common attribute with the driver.

10. The method of claim 1, further comprising updating the response profile of the driver to associate the at least one abnormal driving event with at least one other dynamics pattern of the driver identified to precede the at least one abnormal driving event, wherein the at least one other dynamics pattern relates to bodily dynamics comprising at least one of: a facial expression of the driver, a limb gesture of the driver, a bodily gesture of the driver, and a body pose of the driver.

11. The method of claim 1, further comprising updating the response profile of the driver based on at least one driver state parameter derived from an analysis of fluctuations of a pupil of the at least one eye detected in the at least some of the plurality of images, the at least one driver state parameter is indicative of at least one of: a physiological state of the driver, a cognitive state of the driver and an emotional state of the driver.

12. The method of claim 1, wherein analysis of the at least some of the plurality of images to identify the at least one eye dynamics signal pattern comprising computing at least one eye dynamics signal according to at least one member selected from the group consisting of: a slope of change in eye movement by at least one of a first and second derivative, a magnitude of change in eye movement, and a distribution of frequencies of pupil fluctuations.

13. The method of claim 1, wherein analysis of the at least some of the plurality of images to identify the at least one eye dynamics signal pattern comprising computing at least one eye dynamics signal, applying a threshold to extract one or more peaks of the at least one eye dynamics signal computed, and identifying the at least one eye dynamics signal pattern based on the one or more peaks extracted.

14. The method of claim 1, wherein the energy ratio is between low frequencies in a range of 0 Hz to 0.08 Hz or 0.04 Hz to 0.15 Hz and high frequencies in a range of 0.15 Hz to 0.8 Hz or 0.16 Hz to 0.4 Hz.

15. A system for updating response profiles of drivers used in automated vehicle control, the system comprising:
at least one processor configured to:
operate to capture a plurality of images thereby at least one imaging sensor deployed to monitor at least one eye of a driver of a vehicle;
receive and analyze at least some of the plurality of images to identify at least one eye dynamics signal pattern preceding at least one abnormal driving event occurring in the environment of the vehicle, the at least one eye dynamics signal pattern is identified according to a function of a change in frequencies of pupil fluctuations over time, wherein values of the function are determined using an energy ratio between frequencies in different ranges;
update a response profile of the driver based on an association of the at least one abnormal driving event and the identified at least one eye dynamics signal pattern; and
communicate with at least one control system of the vehicle to provide thereto information based on the updated response profile of the driver, the provided information is configured to enable the at least one control system of the vehicle to predict an imminent abnormal driving event based on an eye dynamics signal pattern of the driver,
wherein the at least one control system is adapted for initiating at least one action for controlling the vehicle according to the imminent abnormal driving event predicted.

16. A method for automated vehicle control using response profiles of drivers updated by performing the method of claim 1, comprising:
operating for capturing a first another plurality of images thereby at least one imaging sensor deployed to monitor at least one eye of a driver of a vehicle;
receiving and analyzing at least some of the first another first plurality of images to identify at least one eye dynamics signal pattern, the at least one eye dynamics signal pattern is identified according to a function of a change in frequencies of pupil fluctuations over time, wherein values of the function are determined using an energy ratio between frequencies in different ranges;
using the identified at least one eye dynamics signal pattern to predict at least one imminent abnormal driving event based on a response profile of the driver; and
using the at least one control system for initiating at least one action for controlling the vehicle according to the predicted at least one abnormal driving event.

17. The method of claim 16, further comprising:
operating for capturing a second another plurality of images thereby the at least one imaging sensor after the identification of the at least one eye dynamics signal pattern;

receiving and analyzing at least some of the second another plurality of images to identify at least one additional eye dynamics signal pattern, the at least one additional eye dynamics signal pattern is identified according to a function of a change in frequencies of pupil fluctuations over time, wherein values of the function are determined using an energy ratio between frequencies in different ranges;

calculating an elapsed time between an occurrence of the at least one eye dynamics signal pattern and an occurrence of the at least one additional eye dynamics signal pattern;

in response to a first calculated elapsed time, using the at least one control system for initiating at least one additional action for controlling the vehicle; and in response to a second calculated elapsed time, using the at least one control system for forgoing initiating the at least one additional action for controlling the vehicle, where the second calculated elapsed time is shorter than the first calculated elapsed time.

18. The method of claim 16, further comprising adjusting the at least one action according to at least one of: a physiological state of the driver, a cognitive state of the driver and an emotional state of the driver.

19. The method of claim 16, further comprising determining the at least one abnormal driving event according to at least one other dynamics pattern predicted to precede the at least one abnormal driving event in the response profile of the driver, wherein the at least one other dynamics pattern relates to bodily dynamics comprising at least one of: a facial expression of the driver, a limb gesture of the driver, a bodily gesture of the driver and a body pose of the driver.

20. The method of claim 16, further comprising using the at least one control system for initiating at least one second action for controlling the vehicle according to a response of the driver to the at least one action, the response of the driver is determined according to an analysis of at least one image captured by the at least one imaging sensor after the at least one action is initiated.

* * * * *